(12) United States Patent
Sweeney et al.

(10) Patent No.: US 10,290,267 B2
(45) Date of Patent: May 14, 2019

(54) FABRICATION OF A DISPLAY COMPRISING AUTONOMOUS PIXELS

(71) Applicant: Microsoft Technology Licensing, LLC, Redmond, WA (US)

(72) Inventors: David Sweeney, Cambridge (GB); Stephen Edward Hodges, Cambridge (GB); Nicholas Yen-Cherng Chen, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 15/130,127

(22) Filed: Apr. 15, 2016

(65) Prior Publication Data

US 2016/0307521 A1 Oct. 20, 2016

Related U.S. Application Data

(63) Continuation-in-part of application No. 14/687,038, filed on Apr. 15, 2015.

(51) Int. Cl.
*G09G 3/34* (2006.01)
*G02F 1/133* (2006.01)
(Continued)

(52) U.S. Cl.
CPC .............. *G09G 3/344* (2013.01); *B05D 1/12* (2013.01); *B05D 1/18* (2013.01); *B32B 37/20* (2013.01); *B32B 38/0004* (2013.01); *G02F 1/13318* (2013.01); *B32B 2255/00* (2013.01); *B32B 2307/202* (2013.01); *B32B 2457/20* (2013.01);
(Continued)

(58) Field of Classification Search
CPC ................ G02F 1/13318; G02F 1/167; Y10T 156/1057; B32B 38/0004
See application file for complete search history.

(56) References Cited

U.S. PATENT DOCUMENTS 5,764,201 A 6/1998 Ranganathan
6,297,787 B1 10/2001 Nishida
(Continued)

FOREIGN PATENT DOCUMENTS

DE 102005054948 5/2007
WO WO2013/190146 12/2013
WO WO2014/203021 12/2014

OTHER PUBLICATIONS

Borghino, "Squids Inspire an Autonomous Camouflaging System," Published Aug. 21, 2014, Retrieved at <<http://www.gizmag.com/squid-inspired-camouftage/33436/>>, 6 pages.
(Continued)

*Primary Examiner* — Mark A Osele
*Assistant Examiner* — Christopher C Caillouet
(74) *Attorney, Agent, or Firm* — Schwegman Lundberg & Woessner, P.A.

(57) ABSTRACT

A method of fabricating a display comprising a plurality of autonomous pixels is described. Each autonomous pixel comprises a display element and a control element. The control element is configured to sense an external stimulus and to generate, entirely within the autonomous pixel, a control signal to drive the display element based, at least in part, on the magnitude of the sensed external stimulus.

20 Claims, 14 Drawing Sheets

(51) Int. Cl.
  *B32B 38/00* (2006.01)
  *B32B 37/20* (2006.01)
  *B05D 1/12* (2006.01)
  *B05D 1/18* (2006.01)
  *G02F 1/167* (2019.01)
  *G09G 3/20* (2006.01)

(52) U.S. Cl.
  CPC .......... *G02F 1/167* (2013.01); *G02F 2201/58* (2013.01); *G09G 3/2088* (2013.01); *G09G 2300/0473* (2013.01); *G09G 2320/08* (2013.01); *G09G 2360/14* (2013.01); *G09G 2360/141* (2013.01); *G09G 2360/142* (2013.01); *G09G 2360/144* (2013.01)

(56) References Cited

U.S. PATENT DOCUMENTS

| | | | |
|---|---|---|---|
| 7,378,791 B2* | 5/2008 | Yamazaki | G02F 1/167 313/504 |
| 7,815,313 B2 | 10/2010 | Ito et al. | |
| 8,174,772 B1 | 5/2012 | DeVaul | |
| 8,279,200 B2 | 10/2012 | Kikin-Gil | |
| 8,621,224 B2 | 12/2013 | Jung et al. | |
| 8,624,832 B2 | 1/2014 | Inoue | |
| 8,736,729 B2 | 5/2014 | Nakano et al. | |
| 8,767,820 B2 | 7/2014 | Montag | |
| 8,791,920 B2 | 7/2014 | Krah | |
| 8,840,747 B2 | 9/2014 | Ogawa et al. | |
| 2005/0007336 A1 | 1/2005 | Albert et al. | |
| 2005/0105159 A1* | 5/2005 | Paolini, Jr. | G02F 1/167 359/252 |
| 2005/0225519 A1 | 10/2005 | Naugler, Jr. | |
| 2008/0043003 A1 | 2/2008 | Vogsland | |
| 2009/0078938 A1* | 3/2009 | Yamazaki | G02F 1/167 257/59 |
| 2009/0256812 A1 | 10/2009 | Ha et al. | |
| 2010/0079416 A1 | 4/2010 | Chung et al. | |
| 2010/0079494 A1 | 4/2010 | Sung et al. | |
| 2010/0144229 A1 | 6/2010 | Lee | |
| 2010/0156761 A1 | 6/2010 | Veres et al. | |
| 2011/0234605 A1 | 9/2011 | Smith et al. | |
| 2013/0135259 A1 | 5/2013 | King et al. | |
| 2013/0241961 A1 | 9/2013 | Lu et al. | |
| 2013/0342892 A1* | 12/2013 | Chan | G02F 1/167 359/296 |
| 2014/0189550 A1 | 7/2014 | Messer et al. | |
| 2014/0264294 A1* | 9/2014 | Holman | H01L 51/56 257/40 |
| 2016/0307520 A1 | 10/2016 | Sweeney et al. | |

OTHER PUBLICATIONS

Brockmeyer, et al., "PAPILLON: Designing Curved Display Surfaces with Printed Optics," Proceedings of the 26th annual ACM Symposium on User Interface Software and Technology, Oct. 8, 2013, 6 pages.

"FireFly," Feb. 10, 2015, retrieved at <<http://www.comp.lancs.ac.uk/firefly/>>, 4 pages.

Graham-Rowe, "E-Paper with Photonic Ink", Published on Sep. 5, 2007, retrieved at <<http://www.technologyreview.com/news/408614/e-paper-with-photonic-ink/>>, 2 pages.

Lee, H.D., "The Influence of Strong Sunlight for Eink Displays," published Oct. 16, 2013, retrieved at <<http:!/latest.repaper. org/2013/10/ 16/the-influence-of-strong-sun light-for-eink-displays/>>, 2 pages.

Tai, et al., "Dependence of Photosensitive Effect on the Defects Created by DC Stress for LTPS TFTs," IEEE Electron Device Letters, vol. 29, Issue 12, Dec. 2008, 3 pages.

Yu, et al., "Adaptive Optoelectronic Camouflage Systems with Designs Insipred by Cephalopod Skins," Proceedings of the National Academy of Sciences of the United States of America, vol. 111, No. 36, Aug. 18, 2014, 52 pages.

Zedde, "Autonomous Pixels," published Mar. 19, 2012, retrieved at <<http:!/intra. iam.hva.nl/contenl/1112/cim/understanding_public_spaces/intro-en-materiaal/Maurice-van-der-Zedde_autonomous-pixels_presentatie.pdf>>, 16 pages.

Office Action for U.S. Appl. No. 14/687,038, dated Sep. 2, 2016, Sweeney et al, "A Display Comprising Autonomous Pixels", 12 pages.

The PCT Search Report and Written Opinion dated Jun. 29, 2016 for PCT Appiciation No. PCT/US2016/025961, 14 pages.

The PCT Search Report and Written Opinion dated Jun. 29, 2016 for PCT Application No. PCT/US2016/027756, 15 pages.

"International Preliminary Report on Patentability", Issued in PCT Application No. PCT/US2016/027756, dated Mar. 27, 2017, 9 pages.

Office Action for U.S. Appl. No. 14/687,038, dated Feb. 10, 2017, Sweeney et al, "A Display Comprising Autonomous Pixels", 15 pages.

The PCT Written Opinion of the International Preliminary Examining Authority for PCT Application No. PCT/US2016/025961, 7 pages.

The PCT Written Opinion of the International Preliminary Examining Authority for PCT Application No. PCT/US2016/027756, 8 pages.

"Final Office Action Issued in U.S. Appl. No. 14/687,038", dated Feb. 5, 2018, 16 Pages.

"Non Final Office Action Issued in U.S. Appl. No. 14/687,038", dated Sep. 28, 2017, 18 Pages.

"International Preliminary Report on Patentability Issued in PCT Application No. PCT/US2016/025961", dated Mar. 27, 2017, 11 Pages.

"Office Action Issued in European Patent Application No. 16720219.1", dated Nov. 30, 2018, 5 Pages.

"Office Action Issued in European Patent Application No. 16720248.0", dated Dec. 14, 2018, 5 Pages.

* cited by examiner

FABRICATION OF A DISPLAY COMPRISING AUTONOMOUS PIXELS

RELATED APPLICATION INFORMATION

This application is a continuation-in-part of, and claims priority to, U.S. patent application Ser. No. 14/687,038, filed on Apr. 15, 2015, which is incorporated here by reference in its entirety.

BACKGROUND

Current displays use complex electronics, row/column drivers for the pixels and timing circuitry in order to render images on the display. Use of row/column drivers makes it difficult to construct displays on non-developable surfaces whilst maintaining a consistent density of pixels throughout the display. A developable surface is one which can be flattened onto a plane without distortion and hence a non-developable surface is one which cannot be flattened onto a plane without distortion (e.g. similar to the problem experienced when projecting maps onto a plane), for example, a spherical surface.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of fabricating a display comprising a plurality of autonomous pixels is described. Each autonomous pixel comprises a display element and a control element. The control element is configured to sense an external stimulus and to generate, entirely within the autonomous pixel, a control signal to drive the display element based, at least in part, on the magnitude of the sensed external stimulus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
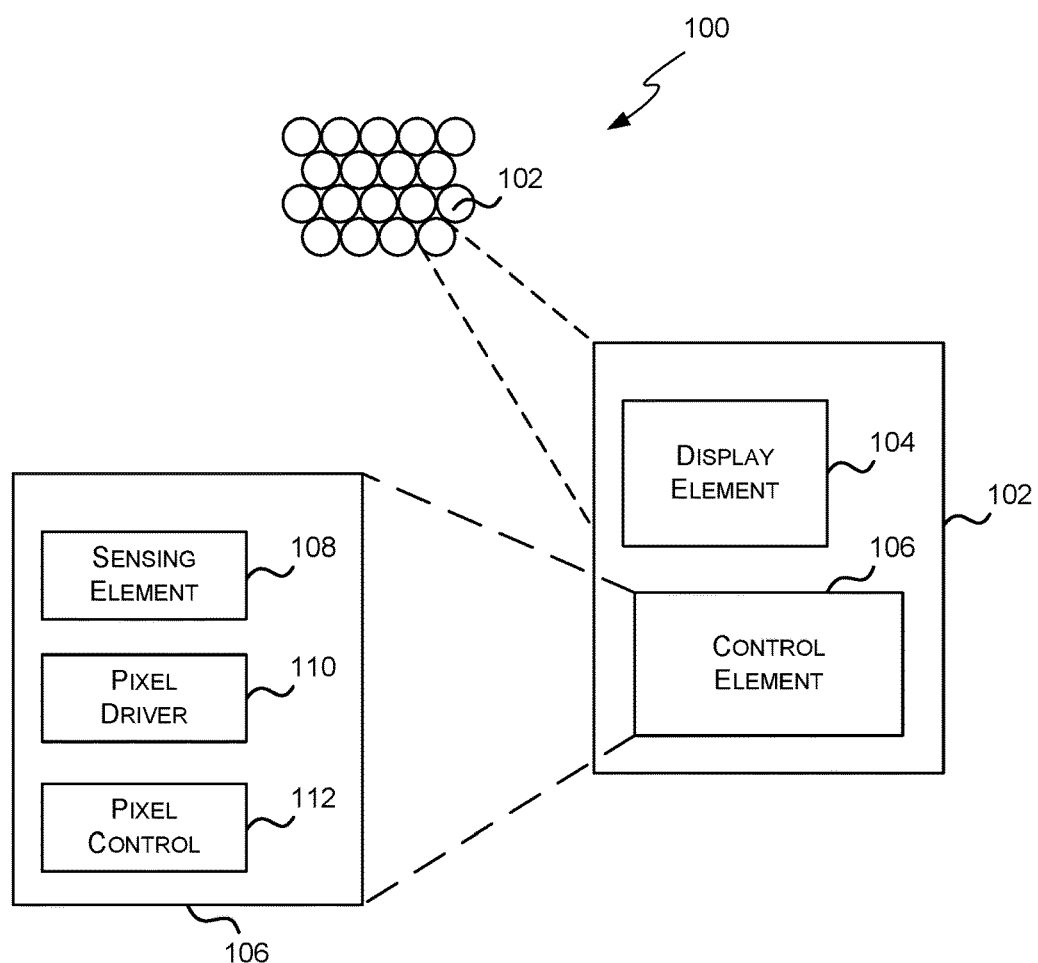
FIG. 1 is a schematic diagram showing a portion of a display comprising a plurality of autonomous pixels.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, the use of row/column drivers makes it difficult to construct displays on non-developable surfaces. The use of row/column drivers means that displays typically comprise a regular or rectilinear array of pixels. The embodiments described below are not limited to implementations which solve any or all of the disadvantages of known displays.

Described herein are displays which are formed from a plurality of autonomous, self-contained pixels. The pixels are described as autonomous because they operate independently (i.e. without requiring drive signals from central driver circuitry) and the signals which are used to control each pixel (e.g. to control whether it is black/white/grey or to control the color of the pixel where it is a color or grey-scale display) are generated locally, i.e. within the pixel itself. Within a pixel, the control signal is generated based, at least in part, on the output of a sensor device which senses the magnitude (or level) of an external stimulus. The external stimulus may comprise ambient signals incident upon the sensor device and/or an applied signal/stimulus which is applied in the region of the pixel itself. In some of the embodiments described below, the only signals/connections which are provided to the pixels in the display are global signals/connections (i.e. such that the same signals/connections are provided to all the pixels in the display), e.g. a global power connection and a global ground connection.

By constructing a display from autonomous, self-contained pixels, the pixels can be arranged in an arbitrary arrangement and are not limited to a regular or rectilinear grid. For example, the pixels may be randomly (or pseudo-randomly) arranged. This enables displays with a constant pixel density across the display to be formed on non-developable surfaces (e.g. such that the pixel density is independent of the topology in a particular region of the display). Additionally, as the pixels operate independently, images can be easily rendered onto the display through the provision of the external stimulus. Where this external stimulus comprises visible light, the display may act as a self-developing photographic surface. Using the autonomous pixels described herein, a display can be implemented with minimal electronic components and this may therefore enable a display to be thinner, more flexible, lighter, cheaper and/or easier to manufacture than traditional displays. It can also be fabricated using standard manufacturing techniques.

Any suitable display technology may be used and in many examples, the display may be an electronic paper display. The term 'electronic paper' is used herein to refer to display technologies which reflect light (like paper) instead of emitting light like conventional LCD displays. As they are reflective, electronic paper displays do not require a significant amount of power to maintain an image on the display and so may be described as persistent displays. A multi-stable display is an example of an electronic paper display. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term 'multi-stable display' is used herein to describe a display which comprises pixels that can move between two or more stable states (e.g. a black state and a white state and/or a series of grey or colored states) and each pixel may therefore be referred to as a 'multi-stable display element' or 'multi-stable pixel'. Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a 'persistent display' or 'persistently stable' display.

FIG. 1 is a schematic diagram showing a part 100 of a display comprising a plurality of autonomous pixels 102. Each autonomous pixel 102 comprises a display element 104 and a control element 106. The display element 104 is an element which can be modified by the control element 106 (e.g. to change its color) in order to display visual information. As described above, each pixel 102 operates autonomously and so comprises its own control element 106 such that signals to control the display element 104 in a particular pixel 102 (e.g. to change the state of the display element) are generated within that pixel 102 (and are not generated in centralized control circuitry).

Figure 5:
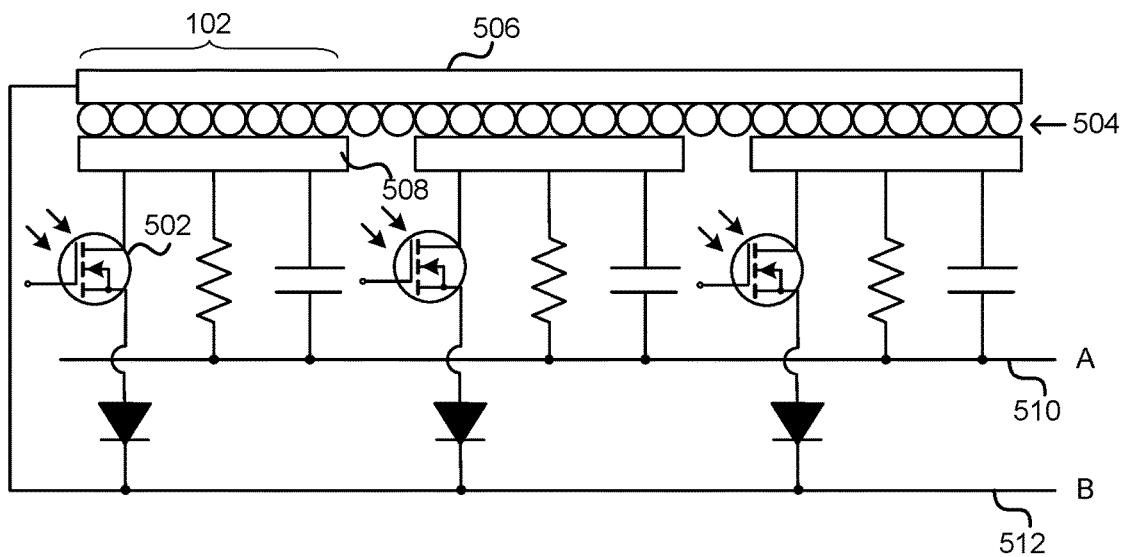
FIG. 5 is a schematic diagram of showing an example implementation of an autonomous pixel.
Figure 6:
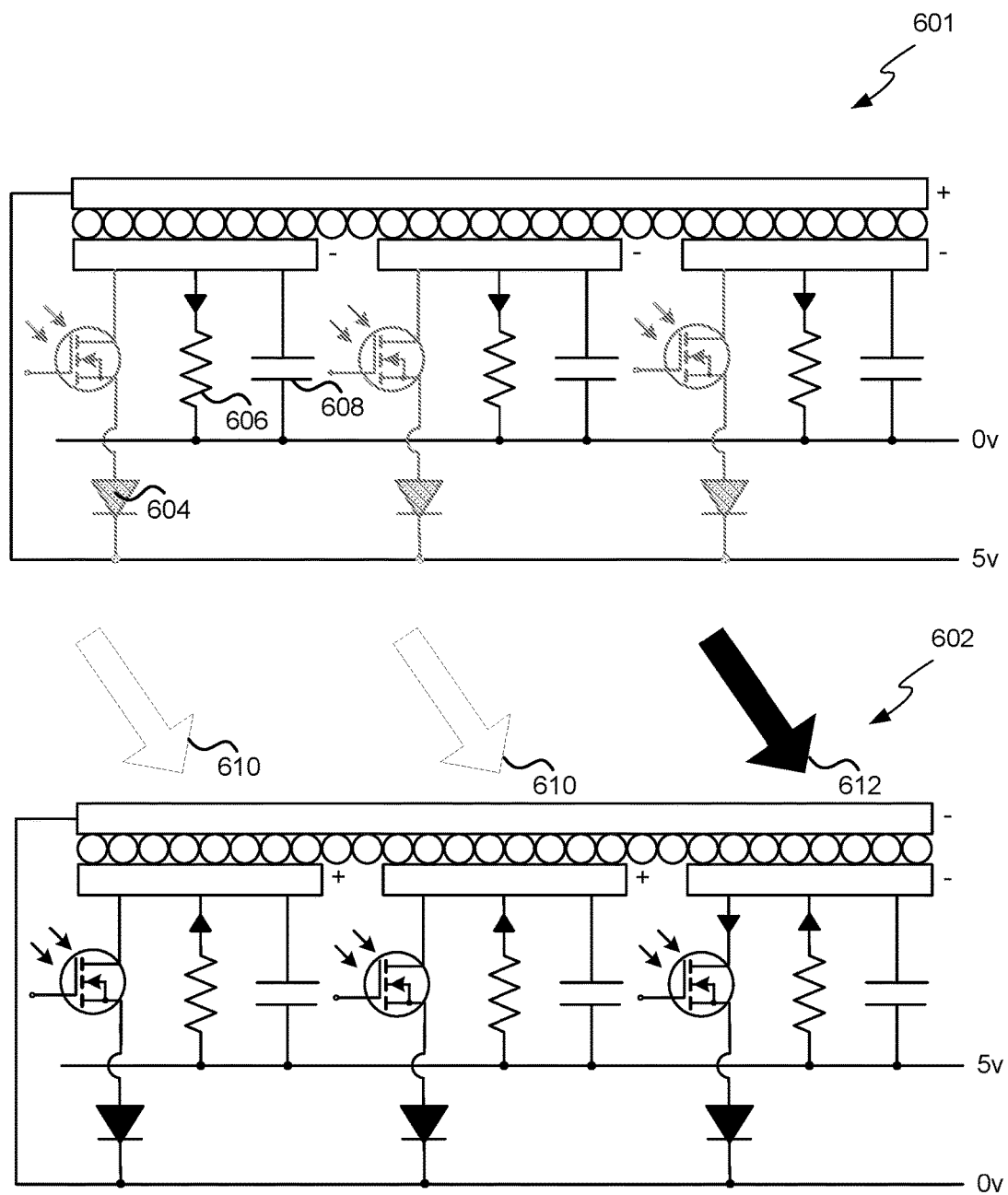
FIG. 6 shows two diagrams explaining the operation of the autonomous pixel shown in FIG. 5.

In various examples, the display element 104 is an electronic paper display element (e.g. it may be multi-stable) and may, for example, comprise an e-ink (or similar) bead or a portion of an electrophoretic film with suitable electrodes arranged to move the contained pigment particles. Where a multi-stable film or ink is used, the film/ink may extend across many pixels with the display elements being defined by the arrangement of electrodes (e.g. as shown in FIGS. 5-6 and described below). In another example, a multi-stable display element may comprise an electromechanical activated pixel (e.g. a flip-dot or flip-disc). Other electronic paper display technologies may alternatively be used, such as electrochromic or cholesteric liquid crystal displays. As described above, use of multi-stable display elements allows the display to retain an image once the electrical power required to change the image is removed.

In other examples, however, the display element 104 is not multi-stable and so requires a substantially constant power supply in order to be able to maintain its state (and hence in order that the display can continue to display an image). In such examples, the display element 104 may comprise an LED, OLED, electrowetting display or LCD (although it will be appreciated that there may be ways in which these technologies may also be used to provide a multi-stable display element).

The control element 106 in a pixel is arranged to control the display element 104 (in the same pixel) in response to an external stimulus, i.e. the control element 106 senses an external stimulus and generates a control signal to drive the display element 104 based, at least in part, on the sensed magnitude of the external stimulus. Consequently, the control element 106 may functionally be considered as a combination of a number of different functional elements: a sensing element 108, a pixel driver 110 and a pixel controller 112. Whilst these elements may be functionally distinct, a single electronic component (e.g. a single transistor) or a group of components may be used to carry out more than one of the functions of the sensing element 108, the pixel driver 110 and the pixel controller 112 (e.g. as shown in FIGS. 5-6 and described below).

The external stimulus may, for example, be visible light (i.e. visible light which is incident upon the display and in particular on the particular pixel 102). In other examples another external stimulus may be used such as other types of radiation (UV, infra-red, X-ray, microwaves, RF, etc., e.g. such that the display may be used to visualize any part of the electromagnetic spectrum), pressure (mechanical, acoustic, vibration, etc.), capacitance, electric and magnetic fields, temperature or chemicals. In all examples, the external stimulus is sensed locally (i.e. within the pixel) and the sensor output is used to control the display element in the pixel. In many of these examples the external stimulus is an analog signal. In all the examples the external stimulus is not a digital signal which encodes data (e.g. a WiFi™ or IrDA signal) and hence the control element 106 does not generate the control signal based on decoded data from the sensed external stimulus but instead generates the control signal based, at least in part, on the magnitude (or level) of the sensed external stimulus. It will be appreciated that some of these external stimuli are not visible (e.g. infra-red) and so enable covert printing/rendering (i.e. other viewers cannot see the image before it is rendered on the display).

The sensing element (or sensor) 108 senses the local environment and in particular the external stimulus and different sensing elements 108 may be used to detect different external stimuli. As mentioned above, the external stimulus may comprise ambient signals incident upon the sensor device and/or an applied signal/stimulus which is applied in the region of the pixel itself. In various examples a display (or a pixel 102) may have different operating modes: one where it detects ambient signals and one where it detects an applied signal and the operation of the pixel 102 (e.g. the control element 106) may change between the different modes, for example by using a different threshold in the second mode (that detects an applied signal) or by otherwise removing the background ambient stimulus from the signal in the second mode. In the case of visible light, the sensing element 108 detects the level of incident light upon the pixel 102. The positioning of the sensing element 108 within the pixel (e.g. in relation to the display element 104) may depend on the particular display element and external stimulus used, i.e. whether the display element 104 is opaque to the stimulus being sensed (in which case the display element 104 cannot be between the sensing element 108 and a front surface of the display, i.e. the sensing element 108 cannot be directly behind the display element 104 and may instead be positioned adjacent to the display element) and/or whether the sensing element 108 is opaque to the signal being output by the display element 104 (in which case the sensing element 108 cannot be between the display element 104 and a front surface of the display, i.e. the sensing element 108 cannot be in front of the display element 104 and may instead be positioned adjacent to the display element). The front (or top) surface of the display is used herein to refer to the viewing surface (i.e. the surface on which an image is rendered) and is not intended to limit the possible orientation of the display itself (e.g. in use) which may be horizontal/vertical or at any other orientation and as described herein may be non-planar.

The pixel controller 112 takes input from the sensing element 108 and outputs a local control signal in order to affect the display element 104 in the pixel 102. In various examples, the pixel controller 112 may perform some simple processing of the input signal, such as thresholding, tone mapping, delay effects, signal processing, blending, etc.

Where thresholding is used this may, for example, involve setting a baseline signal level (e.g. based on ambient conditions such as ambient light) so that only the amount of increased signal above the baseline level (e.g. the amount of increased light incident on any given pixel) is used to drive the value of that pixel. Alternatively, a threshold may be used to provide a binary output to the associated pixel, e.g. if the input signal exceeds the threshold level, a 'high' local control signal may be generated (e.g. an 'on' signal) and if the input signal does not exceed the threshold level, a 'low' local control signal may be generated (e.g. an 'off' signal). Tone mapping is a type of thresholding in which the input signal (e.g. the incident light level) is mapped to output colors to display.

Use of delay effects refers to the introduction of a delay between the detection of the external stimulus and the driving of the display and this may, for example, introduce a fixed or variable time delay. Signal processing may be used such that the output is not just a function of the current input but a function such as smoothing (e.g. over time) is implemented. Where blending is used the refers to the control signal taking into account previous sensed data as stored in a buffer or the sensed data from adjacent or nearby pixels.

The pixel driver 110 (which in various examples may be integrated with the pixel controller 112) amplifies the output of the pixel controller 112 and will depend upon the type of technology used for the display element 104. Where the display element 104 is multi-stable, the pixel driver 110 and other elements within the pixel 102 can be powered down once the display element 104 has been updated.

As described above, in various examples a single transistor (or a single transistor with a few other electrical components) may be used to implement the sensing element 108 (e.g. using a photosensitive transistor or relying on an inherent sensitivity of standard transistors), the pixel controller 112 (e.g. as a simple buffer or by performing thresholding) and the pixel driver 110 (e.g. as a transistor inherently amplifies an external input).

Figure 2:
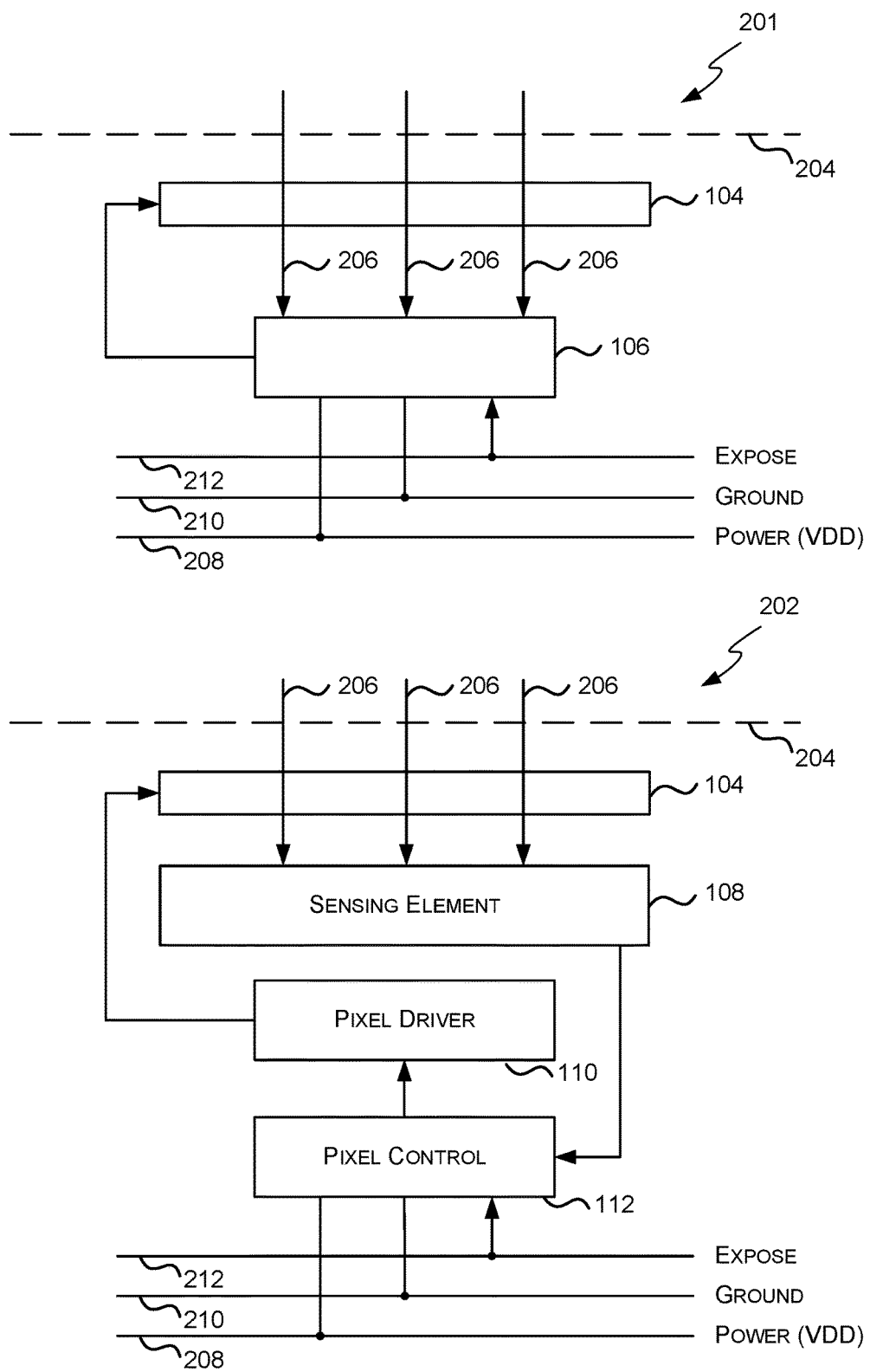
FIG. 2 shows two schematic diagrams of an autonomous pixel such as shown in FIG. 1.

FIG. 2 shows two schematic diagrams 201, 202 of an autonomous pixel 102 in which the component parts 108-112 of the control element 106 are layered behind the display element 104. This arrangement (which may be described as a 'vertical stack') relies upon the display element 104 being transparent to the external stimulus 206, so that the stimulus can be detected by the sensing element 108, and enables pixels to be very closely packed together (e.g. because the electronics in each pixel only occupies the area behind the display element) and this is shown in the perspective views in FIG. 3. As described above, in other examples the display element 104 may be adjacent to the control element 106 (or the sensing element 108 within the control element).

In the first diagram 201 in FIG. 2, there is a single control element 106 shown and in the second diagram 202, the functional component parts 108-112 are shown separately. Both diagrams also show the global power rail/plane 208 and the global ground rail/plane 210 to which all the pixels 102 in a display are connected, i.e. these electrical connections are shared throughout the display and in the arrangement shown, each pixel connects to each rail/plane from above (as can also be seen in FIG. 3), e.g. using electrical vias.

By generating control signals locally and only providing global connections to each pixel (e.g. power lines 208, 210 which in the example shown are power and ground) it is not necessary to route signals to individual pixels. By using the vertical stack configuration shown in FIGS. 2 and 3 it is also not necessary to route signals between pixels. Both of these aspects enable pixels to be densely packed together within a display and the use of global connections (e.g. instead of row/column connections) additionally enables displays with uniform pixel density to be formed on non-developable surfaces.

FIG. 2 shows a third, optional, global signal 212 which may be referred to as an 'expose' or 'trigger' signal. This provides a single, common control signal for all pixels 102 in the display which determines the time when each pixel in the display senses the external stimulus (which may also be described as a local stimulus as it is detected separately within each pixel) and uses this information to display a new image pixel, i.e. the expose signal 212 can be used to synchronize (in time) the operation of all the autonomous pixels 102 within a display (and where this may be synchronized with the source of the external stimulus). A global expose signal may, for example, be used to reduce flicker (so that all pixels are updated at the same time) and/or reduce power consumption (so that all pixels update at defined points in time). This can be described with reference to the flow diagram in FIG. 4. The global expose signal may additionally be used to set an exposure level (e.g. for use in thresholding, as described above).

As described above, each pixel 102 detects an external stimulus at the pixel (block 402, e.g. in sensing element 108) and generates a control signal based on the detected stimulus (block 404, e.g. in pixel controller 112). The display element 104 is then updated based on the control signal (block 406), although as will be appreciated, depending on the control signal and the current state of the display element 104, updating the display element (in block 406) may not necessarily result in a change to the display element (e.g. for a bi-stable element which is currently black it may remain black or it may switch to white depending upon the control signal generated).

The global trigger signal 212 may be generated externally to any of the pixels in the display (for example, as is the case for the global power lines 208, 210 which may, for example, be generated by a discrete power supply within the display). Alternatively, the global trigger signal 212 may be generated by one of the autonomous pixels 102 in the display and used by the other autonomous pixels 102 in the display. In such an example, the autonomous pixel 102 which generates the global trigger signal 212 may generate the trigger signal in response to sensing an 'expose' stimulus or in response to a different trigger mechanism. In various examples, more than one or all of the autonomous pixels in the display may be capable of generating the global trigger signal 212 in response to detecting a trigger signal.

In the absence of a global trigger signal, each autonomous pixel 102 may operate independently and different pixels may be updated (in block 406) at different times. However, where a global trigger signal is used (as detected in block 408), each autonomous pixel 102 still operates independently; however the operation of all the pixels in the display is synchronized in time because the update to display (in block 406, arrow (a)), the generation of the control signal (in block 404, arrow (b)) or the sensing (in block 402, arrow (c)) occurs in response to the detection of a trigger signal (in block 408) and all pixels are connected to the same trigger signal 212. Use of a global trigger signal may, for example, enable an image to be rendered onto a display using a single enable bit.

In another example, instead of using a global trigger signal, pixels may be configured to automatically trigger on power-on and in this example, each autonomous pixel may operate independently but in synchronization.

FIGS. 5 and 6 show an example implementation which uses a transistor 502 to detect the external stimulus (e.g. visible light in this example) and FIG. 5 shows three autonomous pixels 102. This example uses a multi-stable display element which comprises a portion of an electrophoretic film 504 (which is continuous across all three pixels 102) between a portion of a common electrode 506 and a discrete electrode 508 (one per pixel). In the example shown, the common electrode 506 is in front of the electrophoretic film 504 (i.e. between the film 504 and the front face of the display) and is therefore transparent. The discrete electrode 508 is behind the film 504 (i.e. on the other side of the film to the common electrode 506) and is sufficiently transparent to enable the visible light to be incident upon the transistor 502.

Each pixel 102 is connected to two global power lines 510, 512 denoted A and B respectively where one of these power lines (global power line B, 512) is also connected to the common electrode 506 adjacent to the electrophoretic file 504. There is no separate 'enable' line in this example, but as the display is multi-stable, updating of the display can be triggered, for all pixels at the same time, by reversing the voltages of the two global power lines 510, 512.

The first diagram 601 in FIG. 6 shows the configuration for erasing all the pixels in the display. In this configuration, global power line A, 510, is in this example, connected to 0V and global power line B, 512 is connected to 5V (although in other examples a negative voltage may be used instead of 0V and/or other positive voltage levels may be used instead of 5V). In this orientation, the diodes 604 are reverse connected and so no current flows through the diodes. In some implementations where the transistors 502 do not conduct at the reverse biased voltage level (−5V in this example), the diodes 604 may be omitted. In the example shown the pixels are all cleared to white because the common electrode 506 is positively charged and the discrete electrodes 508 are negatively charged. It will be appreciated that FIGS. 5 and 6 show a particular configuration by way of example and in other examples, the charge of the pigments may be swapped (e.g. such that the display erases to black instead of white).

The second diagram 602 in FIG. 6 shows the configuration for 'printing' an image onto the display. In this configuration, the global power lines have been swapped such that global power line A, 510, is connected to 5V and global power line B, 512 is connected to 0V. This means that the common electrode 506 is negatively charged. Additionally, the diode 604 in a pixel is no longer reverse connected and current can flow through the transistor 502 dependent upon the level of incident light. If there is little/no incident light on the left pixel and center pixel (as indicated by the dashed arrows 610), this means that the phototransistor 502 in each of these pixels is not very conductive and so the discrete electrode 508 discharges slower than it charges and so approaches 5V and changes the pixels from white to black. In contrast, if there is incident light on the right pixel (as indicated by the solid arrow 612) this means that the phototransistor in that pixel is sufficiently conducting to lower the voltage of the discrete electrode 508. As a result of the incident light, the discrete electrode 508 in the right pixel discharges faster than it charges, so it remains at 0V and the pixel does not change color (e.g. the pixel remains white in the configuration shown).

As the display elements are multi-stable, it is not necessary to maintain the power provided by the global power lines 510, 512 and the power can be removed after erasing the pixels (as in example 601) and after printing an image (as in example 602).

The diodes 604 shown in FIGS. 5 and 6 are optional as described above because its functionality (i.e. to provide reverse current protection) may be built into the transistor 604. The resistor 606 (which may be a discrete component or a length of PCB track) and optional capacitor 608 (which may be a discrete component or the inherent capacitance of the actual electrode) may be used to limit how quickly the discrete electrode 508 can charge up and therefore to balance the leakage of the transistor when no external stimulus is present. Use of a capacitor 608 will smooth out the exposure (i.e. make it less noisy over the whole display).

Any type of transistor may be used in the implementation shown in FIG. 6 (e.g. a MOSFET) or the transistor 502 may instead be replaced by another component which can operate as an electronic switch. Although a light-controlled transistor (or phototransistor) is shown, a transistor which is sensitive to a different external stimulus may alternatively be used. Alternatively, any component which causes leakage from the discrete electrode in the presence of the external stimulus can be used instead of a transistor. In other examples, instead of using a transistor which is sensitive to the external stimulus, a device 702 which is sensitive to the external stimulus may instead be used to control the transistor, as shown in the first diagram 700 in FIG. 7.

Figure 7:
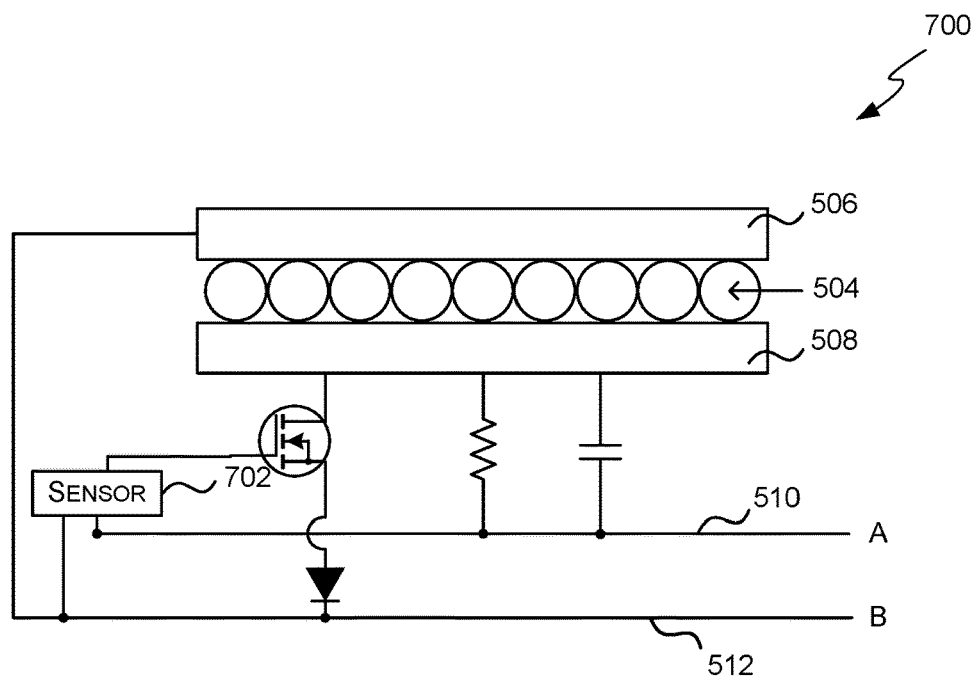
FIG. 7 shows two variations on the example implementation shown in FIG. 5.
Figure 7:
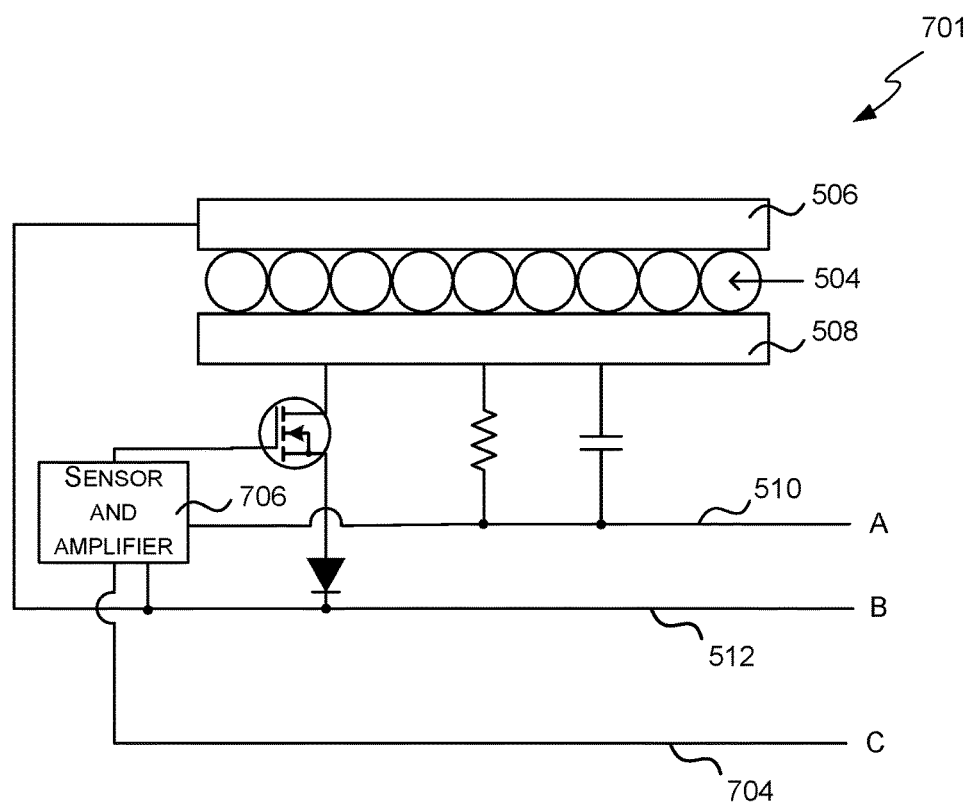

The second diagram 701 in FIG. 7 shows a further variation on the implementation shown in FIGS. 5 and 6. In this variation, the transistor is connected to a third common voltage rail 704, global signal line C via a device 706 which is sensitive to the external stimulus and which includes an amplifier which is adjusted by global signal line C. This global signal line may be used in one of two ways: as a global background removal signal or as a global gain signal and in some examples it may be used as both (e.g. background removal during an erase operation and gain during printing). Alternatively, in various examples, the background removal signal may be generated within an autonomous pixel (e.g. if it can be guaranteed that the external stimulus is not being applied during the erase option, the pixel can use its own sensor to calculate the background signal). As global signal line C is a global signal, all pixels receive the same signal and this is very different from the per-pixel addressing used in standard displays which use row/column drivers.

Where the global signal line is used as a global gain signal (e.g. for photography-like applications), the signal may be used to lower the gain of all the pixels when the display is moved from a dark environment to a very bright environment (which may be achieved by physically moving the display and/or changing the environment where the display is situated). If the display is used to image the ambient environment, it may be sufficient to only lower the gain and not to also change the environment so that it is darker; however in order to apply an image to the display a very bright light source may be required in some situations (for example, which is an order of magnitude brighter than the background e.g. a laser may be used when applying an image in very bright environment).

Where the global signal line is used as a global background removal signal (e.g. for photocopying or printing-like applications), this may enable use of much less bright imaging sources (e.g. projectors) to apply an image to the display in a wide range of lighting conditions. This is because once the background influence is removed from a signal, it leaves the signal applied to the pixel which can, for example, be thresholded/tone-mapped in order to display an image. Although a fixed (e.g. built-in) gain could be used, the massive dynamic range of current lighting options means that without the ability to tune the operation (e.g. using global signal line C), the display would only work well in particular lighting conditions.

In a further example, if two additional global signal lines (or voltage rails) are provided (e.g. global signal line C and a further global signal line), one signal line may be used to remove the effect of any ambient light from the signal and the second may be used to increase the sensitivity of the display (if necessary) after the ambient light has been removed. In such an example, the display could still be updated even if the display was outside in the sun and the external stimulus was provided by a small micro-projector. This could be achieved by removing the sun's influence from each pixel's sensor reading (by subtracting the ambient/background level), then boosting the additional (weak) signal from the projector by multiplying the resultant signal (i.e. the signal after the ambient was subtracted) by the relevant gain value.

Figure 8:
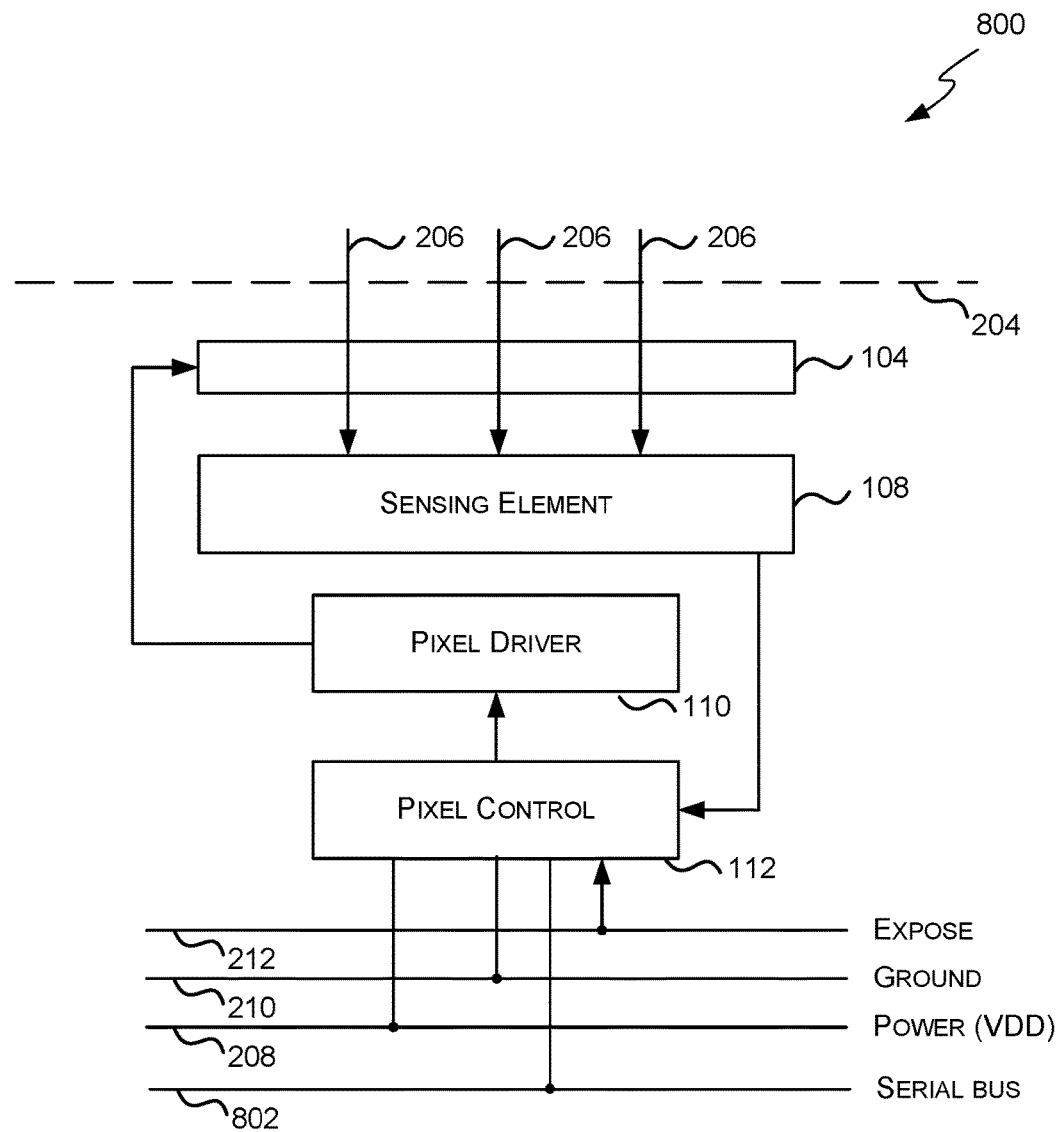
FIG. 8 shows a schematic diagram of another example autonomous pixel.

FIG. 8 shows a schematic diagram 800 of another example autonomous pixel. Whilst this example shows the separate functional elements 108-112 which form the control element 106 (as in the second diagram 202 in FIG. 2), it will be appreciated that the functional elements may be combined in any way (e.g. as described above and shown in the first diagram 201 in FIG. 2). In this example, the autonomous pixel, and hence the display which comprises the autonomous pixel, has a dual display and input capability. This input capability uses the same sensing element 108 as is used to control the display element 104 (and hence detects the same external stimulus); however the pixel comprises an additional connection to a serial bus 802 (i.e. another global signal which is shared amongst all the pixels in the display with the dual capability) over which sensor data may be transmitted. Although a single line is shown in FIG. 8, the serial bus may use a single signal or a group of signals, depending upon the details of the serial protocol used (e.g. I²C). It will be appreciated that a display may comprise no pixels with a dual capability, or a (proper) subset of pixels with the dual capability (i.e. at least one of the pixels in the display is not connected to the serial bus 802) or all the pixels in the display may have the dual display and input capability.

In a display which has dual display and input capability (i.e. which comprises one or more pixels as shown in FIG. 8), each of the pixels which has dual capability has a unique address and this may be provided to each pixel in any way. In an example, an address may be provided to each pixel when it is manufactured. In another example, an address may be provided to each pixel during an initial start-up procedure (e.g. using a calibrating projection image) and may be stored within each pixel (e.g. within the pixel controller 112). The address is stored in non-volatile memory or other hardware (e.g. fuses) within the pixel.

In an example calibration procedure, the external stimulus (e.g. visible light) may be applied to each pixel in turn and the serial bus may communicate addresses in synchronization with the application of the external stimulus such that in response to detecting the external stimulus a pixel reads and stores the pixel address currently being received (or most recently received) via the serial bus. If, however, a pixel does not detect the external stimulus it ignores any pixel addresses received via the serial bus (in this calibration phase). The calibrating projection image which is used in such a procedure serves two purposes, it provides each pixel with its address and also stores the physical position of each pixel in relation to the greater display. For example, if the calibrating projection image applies an external stimulus at a position $u_1,v_1$ at the same time as the serial bus communicates address $A_1$, then it is known that the pixel with address $A_1$ is located at position $u_1,v_1$.

The address which is allocated to a pixel may be used to poll a pixel for sensor data (e.g. to remotely discover the detected level of the external stimulus) in a 'pull' model or alternatively, it may be used by a pixel to autonomously transmit its sensor data in a 'push' model. The sensor data (e.g. the output of the sensing element 108 or data generated from that output) may be used to monitor the surroundings of the display and/or to remotely "read" the image currently displayed on the display comprising the autonomous pixels. For example, as the external stimulus is used to adjust the state (i.e. color) of the display elements in each pixel, by reading the sensor data from each pixel and then applying the same processing as is performed by the pixel controller 112 and/or pixel driver 110, the image that is currently being displayed can be determined (e.g. can be remotely reproduced).

In addition to, or instead of, using the serial bus 802 to read data from pixels, the serial bus 802 may be used to remotely control a pixel. Such an implementation may be considered to be a hybrid solution with the pixels operating autonomously some of the time (e.g. in one mode of operation) and operating under centralized control some of the time (e.g. in a second mode of operation). This provides additional flexibility to the display but again does not require individual, separate connections to each pixel (as in the row/column driver case). However, employing a serial bus to transfer data to the display is relatively slow and so such a hybrid solution is suitable for applications which are not time critical (e.g. where rendering or scanning an image over a period of seconds is acceptable).

Figure 4:
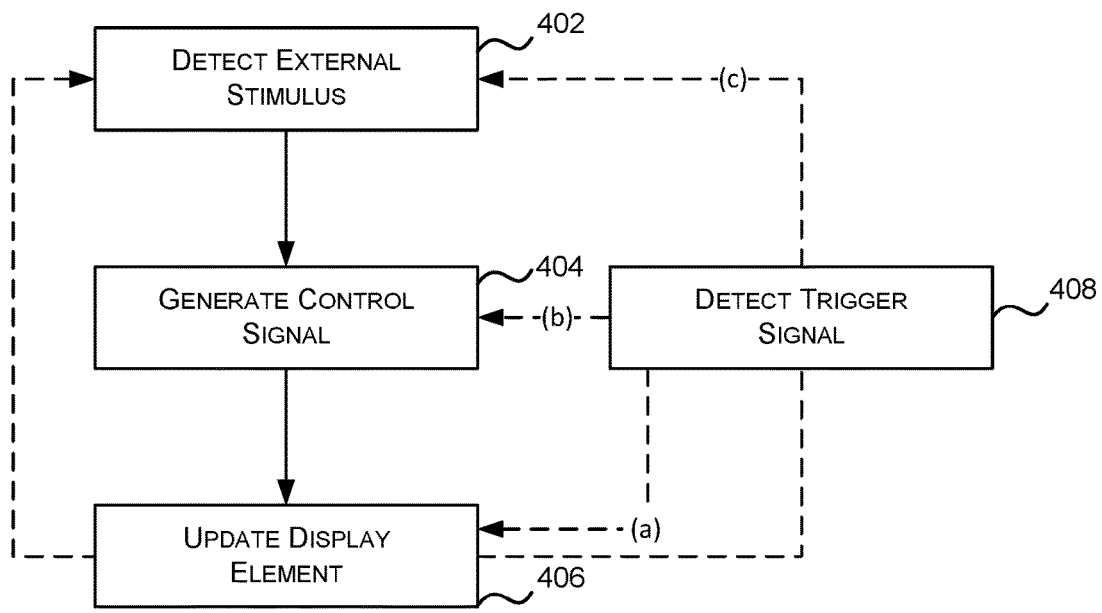
FIG. 4 is a flow diagram showing an example method of operation of an autonomous pixel.

In a further variation, the autonomous pixels described herein may additionally be connected to a row/column driver network to provide a further hybrid solution which does permit fast rendering of images on the display when the pixels are not operating in their autonomous mode. In such a variation, when the pixels are operating in autonomous mode they operate as described above (e.g. as shown in FIG. 4); however, when operating in a "standard" mode, a pixel is controlled by signals received via a row/column driver network. However, as described above, use of a row/column driver network leads to limitations in the placement of pixels, particularly on non-developable surfaces and so in a further variation a display may comprise regions with row/ column driving (which can be updated at high frame rates) and regions of purely autonomous pixels. In a display where the autonomous pixels are additionally connected to a row/column driver network, the mode of operation may be changed according to the content being displayed and this may reduce the overall power consumption of the display. For example, the autonomous mode may be used to update the pixels in the display (e.g. all or part of the display) based on external stimuli for static content, the whole or part of the display may be driven serially for content which changes slowly (which may be lower power than using the row/column driver network) and the row/column driver network may be used to update the display (e.g. all or part of the display) with content which changes rapidly. Furthermore, the availability of the serial bus and/or the autonomous mode provides a display which is robust to breaks in the rows and/or columns.

In examples where the display element 104 emits a stimulus (e.g. visible light) which is the same as, or could interfere with, the external stimulus detected by the sensing element 108, physical shielding (e.g. in the form of screens/barriers) may be used to prevent the stimulus generated by one pixel from being detected by a proximate pixel (e.g. an adjacent pixel or another pixel which is close by). Alternatively, interleaving may be used such that pixels in the display do not emit the stimulus at the same time as other (e.g. all other or all proximate) pixels are detecting the external stimulus. In such an example in a first time slot, all pixels in the display may perform detection and in a second time slot, all pixels in the display may display an image (and hence emit the stimulus), etc. This interleaving may, for example, be implemented using a global trigger signal 212 as shown in FIG. 2.

Figure 9:
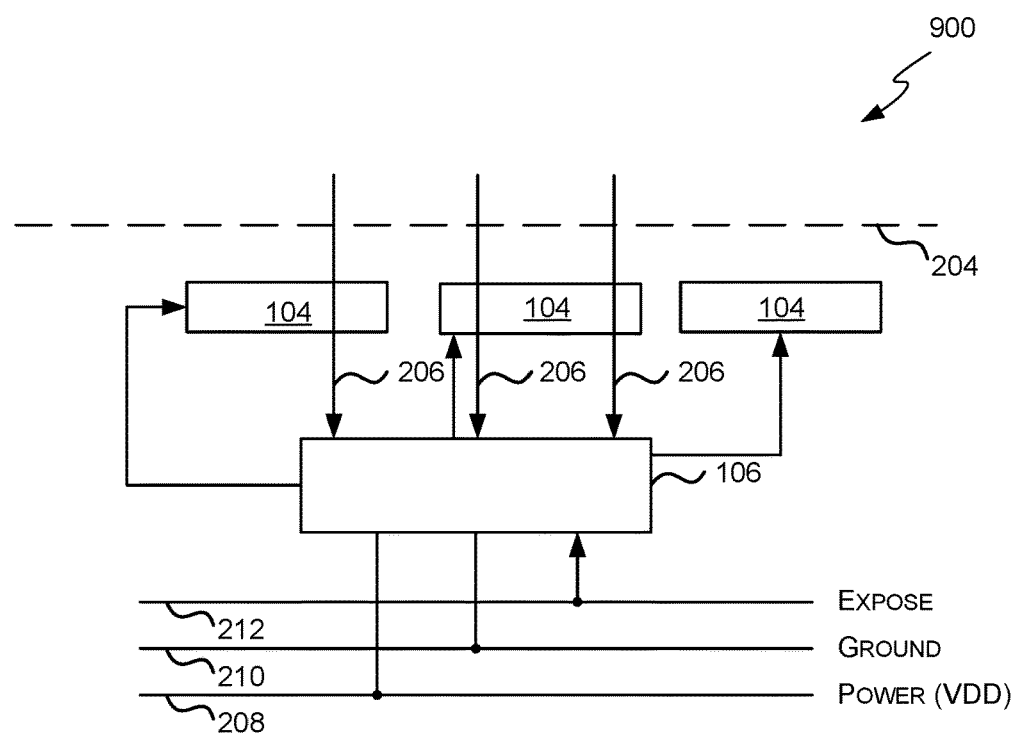
FIG. 9 shows a schematic diagram of an example autonomous pixel which comprises a plurality of display elements.

Although the examples described above show a single display element 104 in each pixel (where this display element may comprise a discrete element or be part of a larger film/layer of display material, e.g. as shown in FIG. 5) such that there is a 1:1 relationship between pixels and display elements 104, in various examples, there may be more than one display element 104 in a pixel 900 as shown in FIG. 9 and the state of all the display elements 104 may be controlled together based on the output of the single sensing element (within the control element 106). In further examples there may be more sensors than pixels (e.g. for a light-field camera arrangement, where a surface acts as a depth sensor or could focus at different depths.

In the examples described above with the exception of the hybrid solutions, each pixel operates autonomously, such that the state (e.g. color) of a display element is affected only by the external stimulus detected by the sensing element 108 in that particular pixel and any processing performed on the output of the sensing element in the pixel controller 112 and/or pixel driver 110 in the pixel (although as shown in the second diagram 701 in FIG. 7, there may be a global sensitivity setting provided to each pixel). There is no influence of one pixel on adjacent pixels (each one operates identically but independently) and control signals are therefore generated locally on a per-pixel basis (and so the identical operation may lead to different colors of the display elements).

In a variation on the examples described above, a pixel may be influenced by its neighbor pixels such that the control signal to drive the display element is based on the external stimulus sensed locally (i.e. within the pixel) and in addition also on the external stimulus sensed by one or more proximate pixels. For example, the control sample may be based on the external stimulus sensed locally and the external stimulus sensed by those pixels which are immediately adjacent to the particular pixel.

Although the present examples are described and illustrated herein as being implemented in a display as shown in FIG. 1 with circular pixels, the system described is provided as an example and not a limitation. As those skilled in the art will appreciate, the present examples are suitable for application in a variety of different types of display systems and different shaped pixels may be used (e.g. triangular, square, hexagonal or irregular shaped pixels such as where the pixels are arranged according to a Voronoi tessellation). The display system may be planar or curved and as described above may be a non-developable surface. Some displays may comprise a small number of pixels (e.g. tens of pixels) and other displays may comprise a very large number of pixels (e.g. from many thousands to many millions of pixels). In many examples the pixel size may be very small (e.g. such that the display has a resolution of 300 pixels-per-inch or more); however, in other examples, much larger pixel sizes (e.g. pixel diameters of several millimeters or centimeters) may be used. Furthermore, although various aspects are described with reference to the specific implementation shown in FIGS. 5-6, these aspects may be used in other examples (e.g. ones which use a different arrangement of components to that shown in FIGS. 5-6).

Using the autonomous pixels described herein, displays may be fabricated with pixels in any arrangement and on surfaces of any complexity (as long as the manufacturing process can fabricate the signal and power stack onto it). In examples where random/pseudo-random pixel placement is used, the display will not suffer from moiré or other aliasing artefacts which standard rectilinear pixel arrangements experience.

The autonomous pixels described herein may be used to create displays of any size and shape and these displays may be used for any application. Example applications include, but are not limited to, displays on highly contoured or irregular surfaces (e.g. on the exterior of a vehicle or other object), displays on wearable devices, toys, game pieces or cards, etc.

Many different fabrication methods/techniques may be used to make a display comprising the autonomous pixels described herein including, but not limited to, roll-to-roll methods, laser cutting, vacuum forming, robot placement of pixels and spray placement of pixels. Various fabrication methods are described below.

Figure 3:
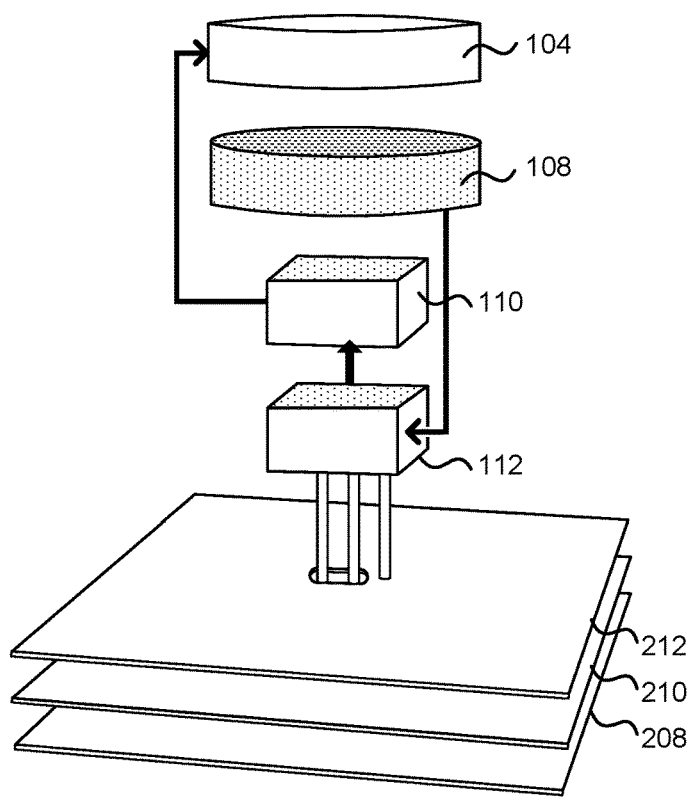
FIG. 3 shows example perspective views of an autonomous pixel and a display comprising a plurality of autonomous pixels.
Figure 3:
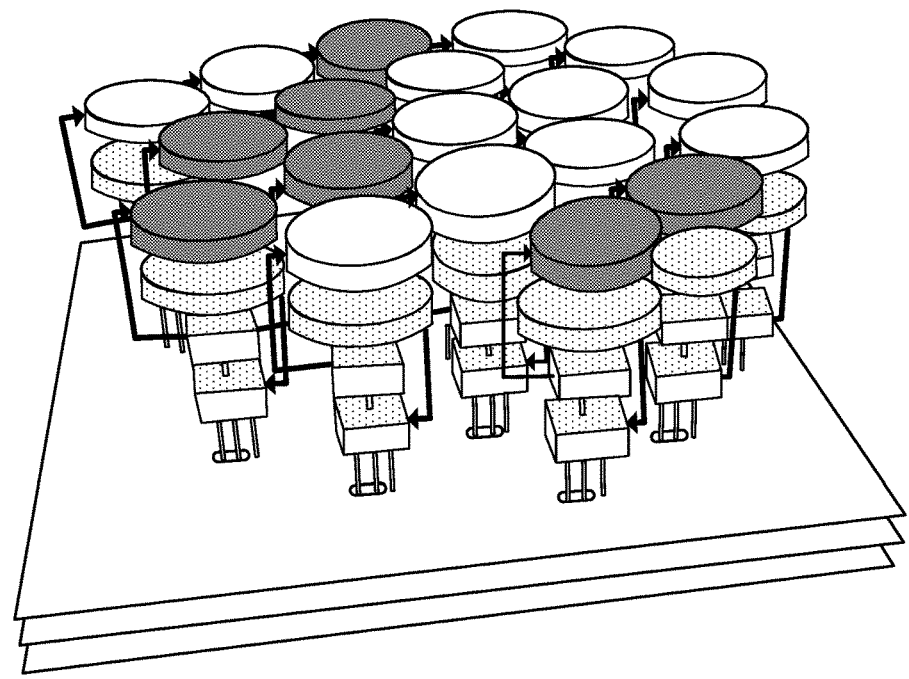
Figure 10:
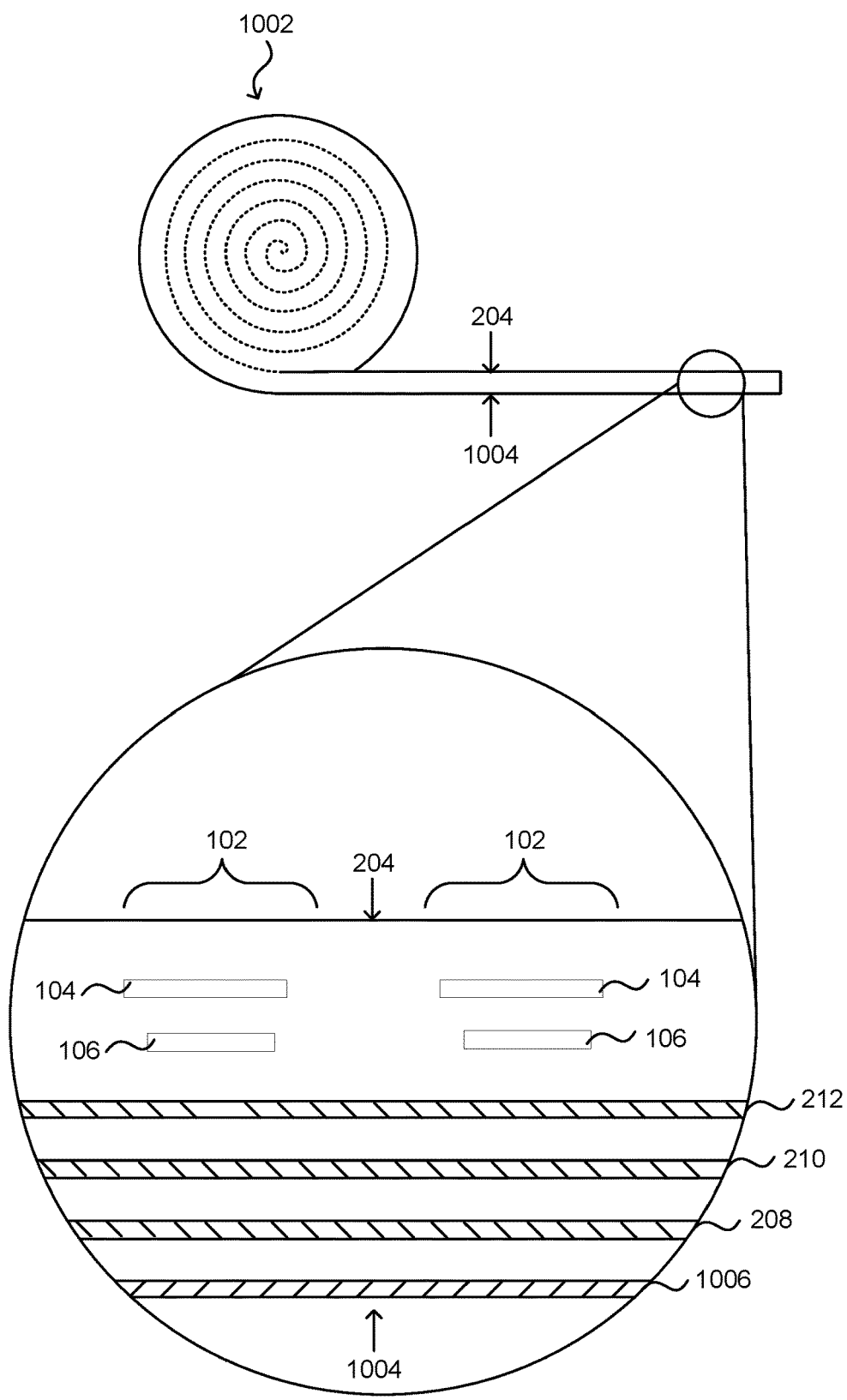
FIG. 10 shows a roll of flexible display material comprising a plurality of autonomous pixels.
Figure 11:
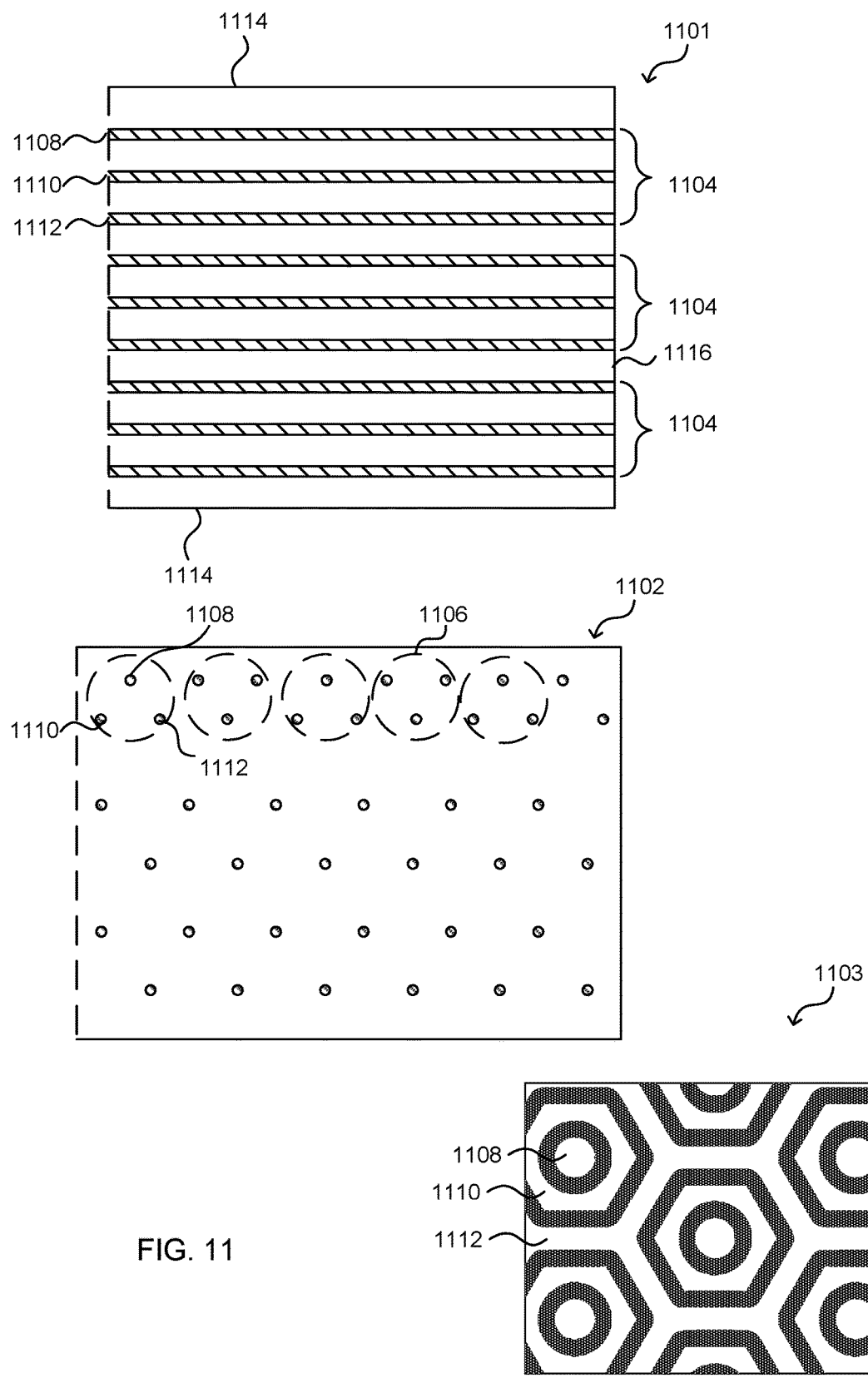
FIG. 11 shows various example arrangements of contacts on the rear of the display material shown in FIG. 10.

The global power plane 208, global ground plane 210 and optional global signal plane 212 as shown in FIG. 3 enable the use of roll-to-roll fabrication processes for displays comprising the autonomous pixels described herein, as shown graphically in FIGS. 10 and 11. As shown in FIG. 8, there may be additional global signal planes, such as one or more serial bus planes 802 and/or additional global signal planes 212. Where roll-to-roll fabrication is used, each of the planes 208, 210, 212, 802 provided is formed from a flexible conductive material (e.g. a flexible layer of metal or other conductive material). The display element 104 and control element 106 may also be formed from flexible materials or may be sufficiently small that they do not experience significant bending when the display comprising the autonomous pixels is rolled up.

FIG. 10 shows an example cross-section through a roll 1002 of display material comprising a plurality of autonomous pixels 102. The plurality of conductive planes 208, 210, 212 are separated by insulating layers. Connections between the display element 104 and control element 106 and between the control element 106 and the global planes

208, 210, 212 may be made using vias (not shown in FIG. 10) through the insulating layers and the conductive planes may therefore be patterned so that to enable connections to be made to a single conductive plane (using a via) without shorting the conductive planes together. Although FIG. 10 shows three global planes (a global power plane 208, a global ground plane 210 and a global signal plane 212), it will be appreciated that in some examples, the global signal plane 212 may be omitted and/or a global serial bus plane 802 may also be included. External connections to the global planes, via the underside 1004 of the sheet of display material, may also be made using vias and as shown in FIG. 10 there may be an optional additional conductive layer 1006 which provides the external contacts for the global planes and which is patterned to provide separate contacts for each of the planes, as shown in FIG. 11.

FIG. 11 shows three different example arrangements 1101, 1102, 1103 of contacts on the underside 1004 of the sheet of display material. In all the examples, the contacts are grouped (e.g. as indicated by the brackets 1104 or dotted outlines 1106) with each group comprising a contact 1108, 1110, 1112 for each of the global planes provided (e.g. the global power plane 208, global ground plane 210 and global signal plane 212 in the example shown; however, as noted above, in other examples the global signal plane 212 may be omitted and/or one or more global serial bus planes 802 and/or other global signal planes 212 may also be included). By grouping the contacts in this way, the display material can be cut into any shape to form a display and still have a rear contact to each of the global planes. As the pixels 102 are autonomous, no additional connections to the pixels are required.

In the first example 1101 shown in FIG. 11, the contacts 1108, 1110, 1112 are parallel lines which run parallel to the edges 1114 of the roll of display material. In other examples, however, linear contacts similar to those shown in example 1101 may be used which are perpendicular to the edges 1114 (e.g. parallel to the end 1116 of the roll) or at any angle to the edges 1114 (e.g. at 45°).

In the second example 1102 in FIG. 11, the contacts 1108, 1110, 1112 are small discrete contacts in a cluster, with one contact per global plane. The contacts within a cluster may be arranged as shown in the example (e.g. in a close packing arrangement) or in other arrangements (e.g. a radial, bulls-eye set of contacts, to aid with alignment) and in various examples, a cluster may comprise more than one contact per global plane. Although the contacts are shown as being circular they may have any shape and need not be of the same size (e.g. the contacts to the global ground plane may be larger than the other contacts).

In the third example 1103 in FIG. 11, the contacts 1108, 1110, 1112 are arranged in a radial, bulls-eye arrangement and this may aid alignment of the display material to the connecting contacts and in this example, the largest contact area (e.g. contact 1112) may, for example, provide a contact to the ground plane 210.

Figure 12:
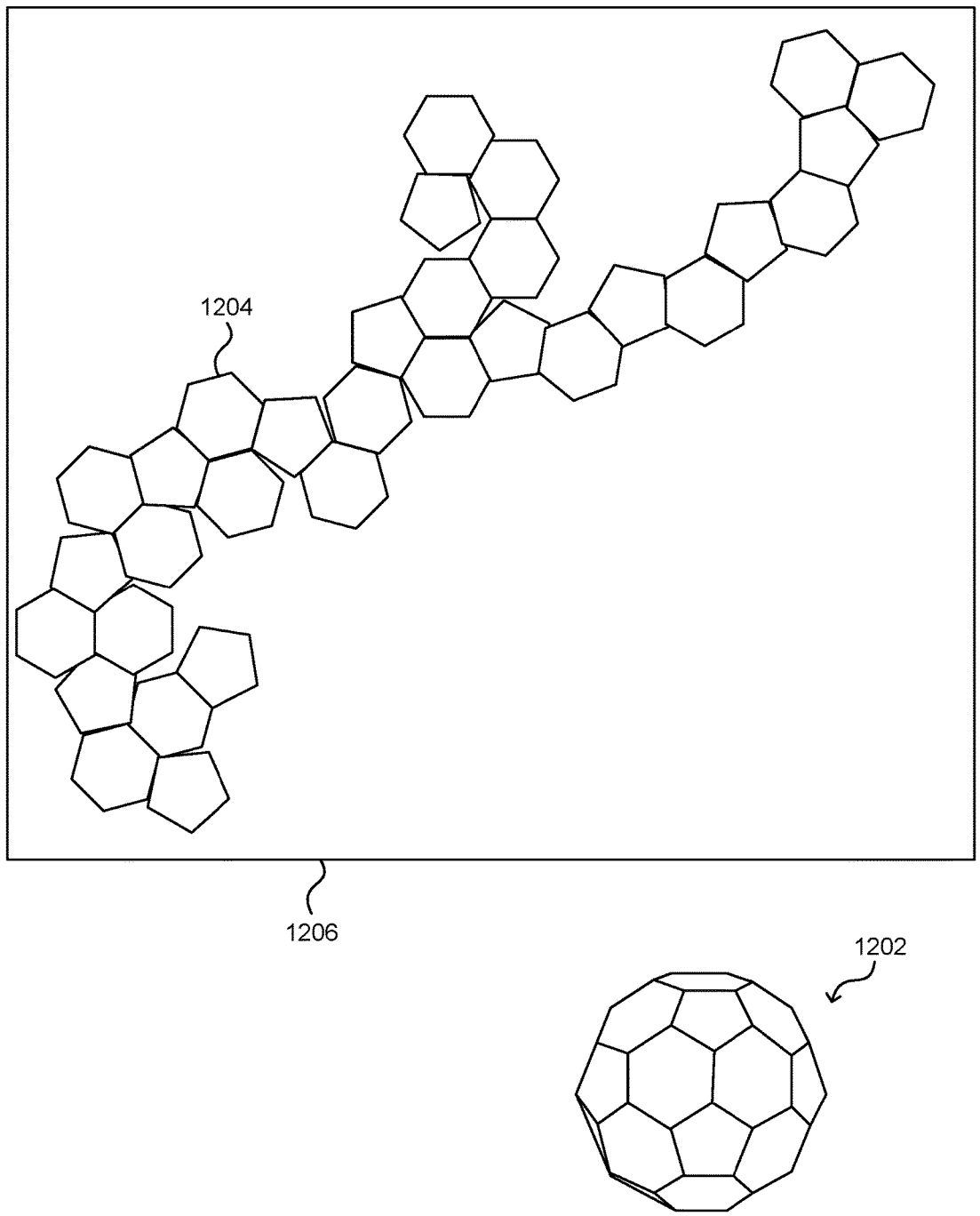
FIG. 12 is a schematic diagram showing how a complex shaped display can be formed from the display material shown in FIG. 10.

Use of roll-to-roll fabrication, as described above, enables long lengths of display material comprising the autonomous pixels to be formed (which may, for example, be many meters or hundreds of meters long) and then subsequently, the display material may be cut into displays of any shape or size, with each display comprising a plurality of the autonomous pixels. The displays which are cut from the display material may be all the same shape and size or of different shape and/or size and as described above, all contacts are provided on the underside of the display material (i.e. the opposite face to the display face 204). As shown in FIG. 12, a complex non-planar display 1202 may be formed by cutting (e.g. laser cutting) the net 1204 of the desired shape from the roll of display material 1206 and then folding (or otherwise forming) it into the 3D shape. Alternatively, non-planar displays may be formed from several pieces cut from the roll of display material which are then butted against each other (e.g. to form a display on a non-developable surface) and contact may be made to the underside of each piece of display material (e.g. to provide the global ground and power connections). In such examples, the pieces may be joined together in any way (e.g. by gluing or sewing the pieces together). The roll of display material may, for example, be used to fabricate a piece of clothing by cutting multiple pieces and sewing them together to form a wearable display comprising a plurality of autonomous pixels.

Due to the use of the autonomous pixels as described herein and with contacts on the underside (e.g. as shown in FIGS. 10 and 11), where a display is formed by butting together multiple pieces of display material, there is no bezel, i.e. there is no non-display region around the entire boundary of each piece.

The flexible display material as described above (e.g. as shown in a roll 1002 in FIG. 10, but which may instead be formed in smaller pieces instead of using roll-to-roll fabrication methods) may alternatively be vacuum-formed or thermoformed to produce a non-planar display. Alternatively, an inflexible display material comprising a plurality of autonomous pixels as described herein (and which may have a structure as shown in the expanded portion of FIG. 10 with the exception that it cannot be formed into a roll) may be used to produce a non-planar display by vacuum-forming or thermo-forming. In such examples, the conductive planes 208, 210, 212, 802 may be formed from materials that can be heated to a temperature at which they become pliable and then formed over a mold (which may be reusable or may, in various examples, be the object to which the display is to be applied to and which comprises exposed contacts on the surface for connecting to the global planes (e.g. via a pattern of contacts as described above with reference to FIG. 11). The flexibility and/or thickness of the display material used for vacuum-forming or thermo-forming may be selected dependent upon the required stiffness of the produced part (i.e. the shaped display material).

The global power plane 208, global ground plane 210 and optional global signal plane 212 as shown in FIG. 3 also enable the use of other fabrication processes for displays comprising the autonomous pixels described herein, including robot placement of pixels, spray placement of pixels or application of pixels by sprinkling, diffusion, etc. Use of spray placement, sprinkling or diffusion of pixels enables random (e.g. stochastic) placement of pixels and use of robot placement enables the pixels to be positioned in any pre-defined pattern which may, for example, be regular or pseudo-random (e.g. dependent upon the programming of the robot performing the pixel placement). As shown in FIG. 8, there may be additional global signal planes, such as one or more serial bus planes 802 and/or additional global signal planes 212.

In various example fabrication processes (e.g. where robot or spray placement of pixels is used), each of the planes 208, 210, 212, 802 provided is first formed, thereby providing a display substrate 1302, and then pixel elements 1304, each comprising a display element 104 and a control element 106, are then placed onto the surface of the planes by a robot or sprayed, sprinkled, diffused or otherwise applied onto the surface. In an example, the display substrate 1302 may be passed through a container comprising a plurality of pixel elements 1304 such that at the input of the container, there are no pixel elements 1304 on the display substrate 1302 and at the output of the container there are many pixel elements 1304 on the substrate 1302.

Figure 13:
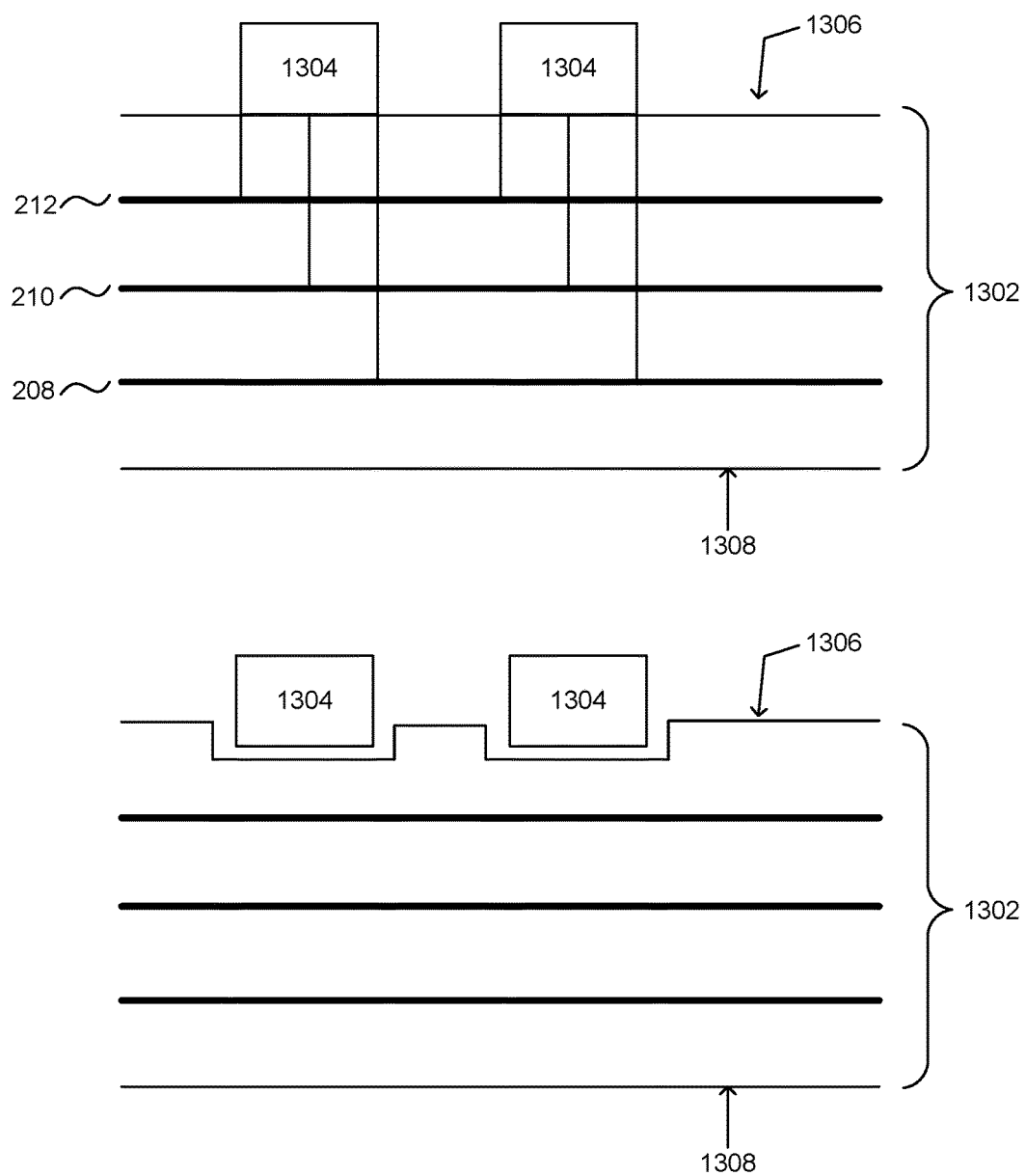
FIG. 13 shows two example display substrates for use with various methods for placement of pixel elements.

As shown in FIG. 13, the upper surface 1306 of the substrate 1302 may be flat or otherwise parallel to the rear surface 1308 of the substrate 1302 or it may be contoured to provide recesses to receive pixel elements 1304.

The orientation of the pixel elements 1304 on the substrate 1302 may be controlled by the placement technique (e.g. by how they are placed by a robot) or by other means. For example the pixel elements 1304 may self-orient due to applied magnetic or electrostatic forces or due to the surface topology of the substrate 1302.

Electrical contact may be made between the pixel elements 1304 and planes 208, 210, 212 by means of pins on the pixel elements (e.g. which make a direct physical and electrical connection to the planes as shown in FIG. 13), inductive coupling, optically (e.g. for data and/or power transmission), or any other means. Where pins are used, these may also mechanically attach the pixel elements 1304 to the substrate 1302; alternatively, other attachment means (e.g. glue, solder or electrically conductive tape which has anisotropic conductivity such as z-axis conductive tape) may be used. Where the pixel elements 1304 are small they may be held onto the substrate 1302 by electrostatic forces. Where the pixel elements 1304 are applied by spray placement, sprinkling, or passing the substrate 1302 through a container containing the pixel elements 1304, electrical charge may be used to attract the pixel elements 1304 to the substrate 1302 and once in place, a covering layer (e.g. a protective layer) may be applied which prevents the pixel elements from moving. This covering layer may provide the front surface of the display device and in various examples, may also comprise one of the global planes (formed from a transparent material), e.g. the global ground plane 210.

The techniques described above in which there is no pre-defined position for pixel elements 1304 on the display substrate 1302 (as a consequence of the application technique and/or the topology of the upper surface 1306 of the substrate 1302) may be referred to collectively as "uncontrolled-pixel-placement processes" or "freeform distribution processes" and these may enable stochastic placement of pixels within a display.

Although FIG. 13 shows three global planes (a global power plane 208, a global ground plane 210 and a global signal plane 212), it will be appreciated that in some examples, the global signal plane 212 may be omitted and/or one or more global serial bus planes 802 may also be included. External connections to the global planes, via the underside 1308 of the substrate, may be made using vias and there may be an optional additional conductive layer (e.g. like conductive layer 1006 shown in FIG. 10) which provides the external contacts for the global planes and which is patterned to provide separate contacts for each of the planes (e.g. as shown in FIG. 11 and described above).

Figure 14:
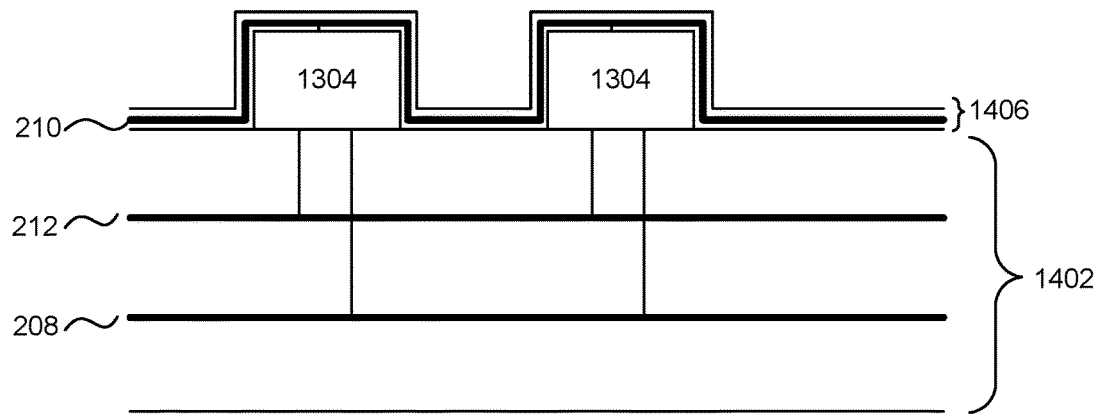
FIG. 14 shows two further example display substrates for use with various methods for placement of pixel elements.
Figure 14:
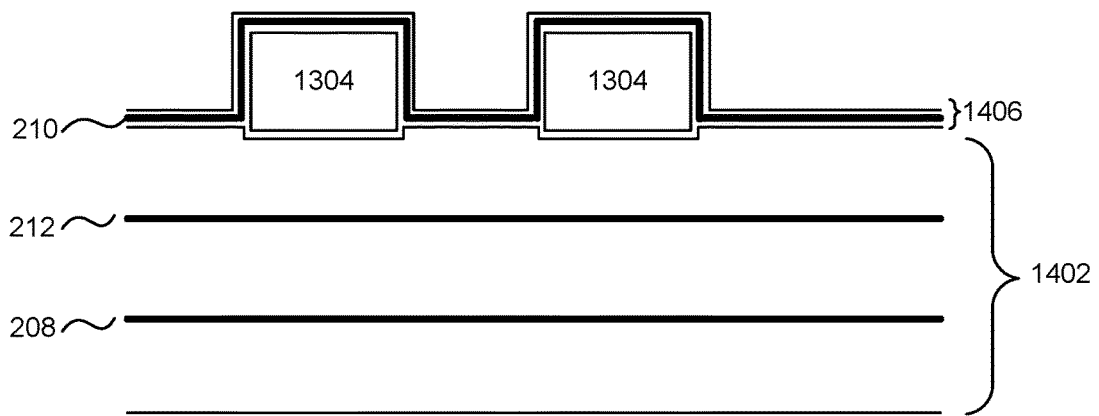

Although in the examples shown in FIGS. 10 and 13, all the global planes 208, 210, 212, 802 are always on the underside of the display material, it will be appreciated that in various examples, one or more of the global planes may be provided above the display element 104 and control element 106. In such examples, any plane(s) which are above the display element 104 are formed from an optically transparent material and any plane(s) which are above the control element 106 are formed from a material which is transparent to the external stimulus. Consequently, although FIG. 13 shows a display substrate 1302 comprising all of the global planes, in other examples, the display substrate 1402 may comprise a proper subset of the planes and a covering layer 1406 may comprise the remaining planes, as shown in FIG. 14.

Although in the examples described above, there is always a global power plane 208, in further examples, each pixel 102 may comprise a power harvesting element (which may for example be part of the control element 106) and in such examples the global power plane 208 may be omitted. In other examples where power harvesting is used, there may be no global electrical planes (e.g. where an expose/trigger signal may be provided through other means, such as optically).

A first further example provides an autonomous pixel comprising: a display element; and a control element arranged to sense an external stimulus and to generate, entirely within the autonomous pixel, a control signal to change a state of the display element based, at least in part, on a magnitude of the sensed external stimulus.

A second further example provides an autonomous pixel comprising: a display element; and a means for sensing an external stimulus and generating, entirely within the autonomous pixel, a control signal to drive the display element based, at least in part, on a magnitude of the sensed external stimulus.

A third further example provides a display comprising a plurality of autonomous pixels according to the first or second further example.

A fourth further example provides a display comprising a plurality of autonomous pixels, each autonomous pixel comprising: a display element; and a control element arranged to sense an external stimulus and to generate, entirely within the autonomous pixel, a control signal to drive the display element based, at least in part, on a magnitude of the sensed external stimulus.

A fifth further example provides a method of fabricating a display comprising a plurality of autonomous pixels, each autonomous pixel comprising: a display element; and a control element arranged to sense an external stimulus and to generate, entirely within the autonomous pixel, a control signal to change a state of the display element based, at least in part, on a magnitude of the sensed external stimulus and wherein the method comprises: forming a sheet of display material comprising the plurality of autonomous pixels; and cutting one or more pieces from the display material to form the display.

In the fifth further example, the display material may be flexible or rigid. A flexible display material may be formed on a roll, e.g. using a roll-to-roll process.

In the fifth further example, a plurality of pieces may be cut from the display material and the method may further comprise: joining the plurality of pieces to form the display.

In the fifth further example, a single piece may be cut from the display material and the method may further comprise: folding the single piece to form the display.

In the fifth further example, the method may further comprise: shaping the display material using vacuum-forming or thermo-forming.

In the fifth further example, forming the sheet of display material may comprise: forming a display substrate comprising one or more conductive planes and applying a plurality of pixel elements to a surface of the display substrate, wherein each pixel element comprises a display element and a control element. The plurality of pixel elements may be applied using a robot, by spraying or sprinkling or by passing the display substrate through a container comprising the pixel elements. The plurality of pixel elements may be applied using an uncontrolled-pixel-placement process. The method may further comprise: applying a covering layer to the display substrate and applied pixel elements. The covering layer may comprise a conductive plane. The display substrate may be flexible or rigid. A flexible display substrate may be formed on a roll, e.g. using a roll-to-roll process.

In the fifth further example, the display material and/or display substrate may further comprise a plurality of contacts on an underside (i.e. on a non-display surface), the plurality of contacts comprising separate contacts to one or more (or each) of the conductive planes in the display material/substrate. The plurality of contacts may comprise line contacts or clusters of contacts. A cluster of contacts may comprise at least one contact for each of the one or more conductive planes. The line contacts or clusters of contacts may be repeated across the underside (e.g. across the entire underside) of the display material/substrate.

In the fifth further example forming the sheet of display material comprising the plurality of autonomous pixels may comprise: forming a plurality of conductive planes separated by insulating layers; and forming electrical connections between the plurality of conductive planes and each of the control elements.

In the fifth further example, forming the sheet of display material may further comprise: forming a plurality of contacts on an underside of the sheet of display material, the plurality of contacts providing separate electrical connections to each of one or more of the conductive planes. The plurality of contacts may comprise a plurality of line contacts with each line contact providing an electrical connection to one of the conductive planes. The plurality of contacts may (in addition or instead) comprise a plurality of clusters of contacts, wherein each cluster comprises a set of contacts each providing an electrical connection to a different one of the conductive planes.

In the fifth further example, the plurality of conductive planes may comprise two or more planes selected from: a global power supply plane to which each autonomous pixel is connected; a global earth plane; a global trigger signal plane to which each autonomous pixel is connected and wherein an autonomous pixel is arranged to sense the external stimulus and/or drive the display element in response to a signal received via the global trigger signal line; a global signal plane to which each autonomous pixel is connected and wherein the control element is arranged to generate, entirely within the autonomous pixel, the control signal to drive the display element based, at least in part, on the magnitude of the sensed external stimulus and a level received via the global signal line; and a serial bus plane to which two or more autonomous pixels are connected and wherein the control element in each of the two or more autonomous pixels connected to the serial bus is further arranged to: store a unique address; and use the unique address to communicate data relating to the sensed external stimulus to a separate entity via the serial bus.

In any of the first to fifth further examples the display element may be an electronic paper display element.

In any of the first to fifth further examples the display element may be a multi-stable display element or a bi-stable display element.

In any of the first to fifth further examples the control signal may be arranged to drive the display and update a state of the display element based, at least in part, on a detected level of the sensed external stimulus.

In any of the first to fifth further examples the control element may comprise: a sensing element arranged to detect the external stimulus; a pixel controller arranged to generate a local control signal based, at least in part, on an output of the sensing element; and a pixel driver arranged to drive the display element using the local control signal. The pixel driver may further be arranged to amplify the local control signal and to drive the display element using the amplified local control signal.

In any of the first to fifth further examples each autonomous pixel may include a single sensing element and a single display element.

In any of the third to fifth further examples the display may further comprise: a global power supply to which each autonomous pixel is connected.

In any of the third to fifth further examples the display may further comprise: a global trigger signal line to which each autonomous pixel is connected and wherein an autonomous pixel is arranged to sense the external stimulus and/or drive the display element in response to a signal received via the global trigger signal line.

In any of the third to fifth further examples the display may further comprise: a global sensitivity setting signal line to which each autonomous pixel is connected and wherein the control element is arranged to generate, entirely within the autonomous pixel, the control signal to drive the display element based, at least in part, on the magnitude of the sensed external stimulus and a level received via the global sensitivity setting signal line.

In any of the third to fifth further examples the display may further comprise: one or more global connections to all the autonomous pixels and wherein the display does not include individual connections to any of the autonomous pixels.

In any of the third to fifth further examples the display may not include a row/column driver network.

In any of the third to fifth further examples each of the plurality of autonomous pixels may operate independently of any other of the autonomous pixels in the display.

In any of the third to fifth further examples the display may further comprise: a display surface and wherein the display element and the control element in an autonomous pixel are arranged in a stack perpendicular to the display surface such that the display element is between the control element and the display surface.

In any of the first to fifth further examples the control element may comprise a transistor which is sensitive to the external stimulus and optionally wherein the external stimulus is light.

In any of the third to fifth further examples the display may further comprise: a serial bus to which two or more autonomous pixels are connected, and wherein the control element in each of the two or more autonomous pixels connected to the serial bus is further arranged to: store a unique address; and use the unique address to communicate data relating to the sensed external stimulus to a separate entity via the serial bus. Each of the two or more autonomous pixels connected to the serial bus may have two modes of operation, in a first autonomous mode, the control element generates, entirely within the autonomous pixel, a control signal to drive the display element based, at least in part, on the magnitude of the sensed external stimulus and in a second non-autonomous mode, the control element generates a control signal to drive the display element based, at least in part, on a signal received via the serial bus.

In any of the first to fifth further examples the control element may be arranged to generate the control signal based on the magnitude of the sensed external stimulus and a magnitude of an external stimulus sensed by one or more proximate autonomous pixels in the display.

In any of the third to fifth further examples the plurality of autonomous pixels may not be arranged on a regular grid within the display.

A sixth further example provides a method comprising: sensing an external stimulus within a pixel in a display; and in response to detecting an external stimulus, generating a control signal to update a display element within the pixel based, at least in part, on a magnitude of the sensed external stimulus.

The control signal may be generated or the display element may be updated in response to receiving a global trigger signal.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

We claim:

1. A method of fabricating a display comprising a plurality of autonomous pixels, the method comprising:
    forming a sheet of display material comprising the plurality of autonomous pixels, each autonomous pixel comprising a substrate comprising a first conductive plane, a second conductive plane, a control element, a display element, a first insulating layer between the first and second conductive planes, a second insulating layer on the second conductive plane and between the second conductive plane and the control element, and a third insulating layer on the control element and between the control element and the display element, the control element arranged to sense an external stimulus and to generate, entirely within the autonomous pixel, a control signal to drive the display element based, at least in part, on a magnitude of the sensed external stimulus; and
    cutting one or more pieces from the display material to form the display.

2. A method according to claim 1, wherein the display material is flexible.

3. A method according to claim 2, wherein the display material is formed using a roll-to-roll process.

4. A method according to claim 1, wherein a plurality of pieces are cut from the display material and the method further comprises:
 joining the plurality of pieces to form the display.

5. A method according to claim 1, wherein a single piece is cut from the display material and the method further comprises:
 folding the single piece to form the display.

6. A method according to claim 1, wherein the method further comprises:
 shaping the display material using vacuum-forming or thermo-forming.

7. A method according to claim 1, wherein forming the sheet of display material comprising the plurality of autonomous pixels comprises:
 forming a display substrate comprising one or more conductive planes; and
 applying a plurality of pixel elements to a surface of the display substrate, wherein each pixel element comprises the display element and the control element, and wherein the control element is electrically connected to the first and second conductive planes.

8. A method according to claim 7, wherein applying a plurality of pixel elements to a surface of the display substrate comprises:
 applying the plurality of pixel elements to the surface of the display substrate using a robot.

9. A method according to claim 7, wherein applying a plurality of pixel elements to a surface of the display substrate comprises:
 spraying the plurality of pixel elements onto the surface of the display substrate.

10. A method according to claim 7, wherein applying a plurality of pixel elements to a surface of the display substrate comprises:
 passing the display substrate through a container comprising the pixel elements.

11. A method according to claim 7, further comprising:
 applying a coveting layer to the display substrate and applied pixel elements.

12. A method according to claim 11, wherein the covering layer comprises a third conductive plane, the third conductive plane formed of a transparent material and retaining the display element in its location on the substrate.

13. A method according to claim 1, wherein forming the sheet of display material comprising the plurality of autonomous pixels comprises:
 forming a sensing element of the control element between the display element and the second conductive plane;
 forming a pixel driver of the control element between the sensing element and the second conductive plane;
 forming a pixel control of the control element between the pixel driver and the second conductive plane; and
 electrically connecting the pixel control to the first and second conductive planes, the pixel driver, and the sensing element, and the pixel driver to the display element.

14. A method according to claim 13, wherein forming the sheet of display material comprising the plurality of autonomous pixels further comprises:
 forming a plurality of contacts on an underside of the sheet of display material, the plurality of contacts providing separate electrical connections to each of the first and second conductive planes.

15. A method according to claim 14, wherein the plurality of contacts comprises a plurality of line contacts with each line contact providing an electrical connection to one of the first and second conductive planes.

16. A method according to claim 14, wherein the plurality of contacts comprises a plurality of clusters of contacts, wherein each cluster comprises a set of contacts each providing an electrical connection to a different one of the first and second conductive planes.

17. A method according to claim 13, wherein the first and second conductive planes respectively comprise one of:
 a global power supply plane to which each autonomous pixel is connected;
 a global earth plane;
 a global trigger signal plane to which each autonomous pixel is connected and wherein an autonomous pixel is arranged to sense the external stimulus and/or drive the display element in response to a signal received via the global trigger signal line;
 a global signal plane to which each autonomous pixel is connected and wherein the control element is arranged to generate, entirely within the autonomous pixel, the control signal to drive the display element based, at least in part, on the magnitude of the sensed external stimulus and a level received via the global signal line; and
 a serial bus plane to which two or more autonomous pixels are connected and wherein the control element in each of the two or more autonomous pixels connected to the serial bus is further arranged to: store a unique address; and use the unique address to communicate data relating to the sensed external stimulus to a separate entity via the serial bus.

18. A method according to claim 1, wherein the display element is an electronic paper display element.

19. A method according to claim 1, wherein the control signal is arranged to drive the display and update a state of the display element based, at least in part, on a detected level of the sensed external stimulus.

20. A method according to claim 1, wherein the display element is transparent wherein the control element comprises:
 a sensing element arranged to detect the external stimulus;
 a pixel controller arranged to generate a local control signal based, at least in part, on an output of the sensing element; and
 a pixel driver arranged to drive the display element using the local control signal, the pixel driver situated between the sensing element and the pixel controller and the sensing element situated between the pixel driver and the display element.

* * * * *